US009200953B2

(12) United States Patent
Mazzillo

(10) Patent No.: US 9,200,953 B2
(45) Date of Patent: Dec. 1, 2015

(54) SPECTROMETER INCLUDING A GEIGER-MODE AVALANCHE PHOTODIODE

(75) Inventor: Massimo Cataldo Mazzillo, Corato (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 759 days.

(21) Appl. No.: 13/559,317

(22) Filed: Jul. 26, 2012

(65) Prior Publication Data

US 2013/0030763 A1    Jan. 31, 2013

(30) Foreign Application Priority Data

Jul. 28, 2011    (IT) .............................. TO2011A0689

(51) Int. Cl.
*G01J 1/44*  (2006.01)
*G01J 3/28*  (2006.01)
*G01J 9/00*  (2006.01)

(52) U.S. Cl.
CPC .... *G01J 1/44* (2013.01); *G01J 3/28* (2013.01); *G01J 9/00* (2013.01)

(58) Field of Classification Search
CPC .................. G01J 1/44; G01J 3/28; G01J 9/00
See application file for complete search history.

(56) References Cited

U.S. PATENT DOCUMENTS 8,188,563 B2 *    5/2012  Finkelstein et al. .......... 257/481
8,610,808 B2 *  12/2013  Prescher et al. .............. 348/276
8,637,875 B2 *    1/2014  Finkelstein et al. ............ 257/84
8,716,643 B2 *    5/2014  Eldesouki et al. ......... 250/208.1
2006/0131480 A1 *  6/2006  Charbon et al. ........... 250/214.1

OTHER PUBLICATIONS

Renker, "Geiger-mode avalanche photodiodes, history, properties and problems", 2006, Nuclear Instruments and Methods in Physics Research A 567(2006) 48-56.*
Aull et al, "Geiger-Mode Avalanche Photodiodes for Three-Dimensional Imaging", Line. Lab. J. vol. 13, No. 2, pp. 335-350, 2002.
Campisi et al, "Multipixel Geiger-Mode Photon Detectors for Ultra-Weak Light Sources", Nuclear Instruments & Methods in Physics Research. Section A: Accelerators, Spectrometers, Detectors, and Associated Equipment, Elsevier BV * North-Holland, Netherlands, vol. 571, No. 1-2, Jan. 26, 2007, pp. 350-354.

(Continued)

Primary Examiner — Regis Betsch
(74) Attorney, Agent, or Firm — Seed IP Law Group PLLC

(57) ABSTRACT

A spectrometer including: a photodiode having a depleted region and generating an electrical detection signal indicating instants of detection of optical pulses; a converter generating an electrical delay signal, indicating delays between the instants of detection and corresponding instants of emission of the optical pulses; a memory, storing a theoretical function corresponding to the probability of triggering an avalanche by a charge carrier generated in the depleted region; and a computing stage which determines a statistical distribution of the delays between the instants of detection and the corresponding instants of emission; selects a Gaussian portion of the statistical distribution; calculates the ratio between the sum of the number of delays of the Gaussian portion and the sum of the number of delays of the statistical distribution; and determines an estimate of the wavelength of the optical pulses on the basis of the theoretical function and of the sample value.

25 Claims, 8 Drawing Sheets

(56) References Cited

OTHER PUBLICATIONS

Cova et al, "Avalanche Photodiodes and Quenching Circuits for Single-Photon Detection," Appl. Opt., vol. 35, No. 12, pp. 1956-1976, 1996.

D'Ascenzo, "Characterization of Silicon Photomultiplier as a Photodetector for Positron Emission Tomography", Phd Thesis, University of Pisa, 2005.

Mazzillo et al, "Quantum Detection Efficiency in Geiger Mode Avalance Photodiodes", IEEE Transactions on Nuclear Science, IEEE Service Center, New York, NY, US, vol. 55, No. 6, Dec. 1, 2008, pp. 3620-3625.

Mazzillo et al, "Silicon Photomultiplier Technology at STMicroelectonics", IEEE Trans. Nucl.Sci, vol. 56, No. 4, pp. 2434-2442, 2009.

Mazzillo et al, "Timing Performances of Large Area Silicon Photomultipliers Fabricated at STMicroelectonics", IEEE Trans. Nucl.Sci, vol. 57, No. 4, pp. 2273-2279, 2010.

Mazzillo et al, "Single Photon Avalanche Photodiodes Arrays", Sens. Actuators A, vol. 138, pp. 306-312, 2007.

Niclass et al, "Design and Characterization of a CMOS 3-D Image Sensor Based on Single Photon Avalanche Diodes", IEEE J. Solid-State Circuits vol. 40, No. 9, pp. 1847-1854, 2005.

Sciacca et al, "Silicon Planar Technology for Single-Photon Optical Detectors," IEEE Trans. Electron Devices, vol. 50, No. 4, pp. 918-925, 2003.

Sciacca et al, "Arrays of Geiger Mode Avalanche Photodiodes", IEEE Photon. Technol. Lett., vol. 18, No. 15, pp. 1633-1635, 2006.

Zappa et al, "Principles and Features of Single-Photon Avalanche Diode Arrays", Sens. Actuators A, vol. 140, pp. 103-112, 2007.

* cited by examiner

SPECTROMETER INCLUDING A GEIGER-MODE AVALANCHE PHOTODIODE

BACKGROUND

1. Technical Field

The present disclosure relates to a spectrometer including a Geiger-mode avalanche photodiode.

2. Description of the Related Art

In the technical field of photon detection, so-called Geiger-mode avalanche photodiodes (GMAPs) are known, which can theoretically enable detection of single photons.

A Geiger-mode avalanche photodiode, also known as single-photon avalanche diode (SPAD), is formed by an avalanche photodiode (APD), and hence comprises a junction of semiconductor material, which has a breakdown voltage $V_B$ and is biased, in use, with a reverse-biasing voltage $V_A$ higher in modulus than the breakdown voltage $V_B$, which, as is known, depends upon the semiconductor material and the doping level of the least doped region of the junction itself. In this way, the junction has a particularly extensive depleted region, present inside which is a non-negligible electrical field. Hence, generation of a single electron-hole pair, caused by absorption within the depleted region of a photon incident on the SPAD, can be sufficient to trigger a process of ionization. This process of ionization in turn causes an avalanche multiplication of the charge carriers, with gains in the region of $10^6$, and consequent generation in short time intervals (hundreds of picoseconds) of the so-called avalanche current, or more precisely of a pulse of the avalanche current.

The avalanche current can be collected, typically by means of an external circuitry connected to the junction, for example, by means of appropriate anode and cathode electrodes, and represents an output signal of the SPAD, also referred to as output current. In practice, for each photon absorbed, a pulse of the output current of the SPAD is generated.

The fact that the reverse-biasing voltage $V_A$ is appreciably higher than the breakdown voltage $V_B$ means that the process of avalanche ionization, once triggered, is self-sustaining. Consequently, once triggered, the SPAD is no longer able to detect photons, with the consequence that, in the absence of appropriate remedies, the SPAD manages to detect arrival of a first photon, but not arrival of subsequent photons.

To be able to detect also the subsequent photons, it is necessary to turn off the avalanche current generated within the SPAD, arresting the process of avalanche ionization, and in particular lowering, for a period of time known as hold-off time, the effective voltage $V_e$ across the junction so as to inhibit the ionization process. For this purpose, it is known to use so-called quenching circuits, whether of an active or passive type. Next, the reverse-biasing voltage $V_A$ is restored in order to enable detection of a subsequent photon.

BRIEF SUMMARY

An embodiment provides a spectrometer that will enable the drawbacks of the known art to be overcome at least in part.

An embodiment is directed to a spectrometer and a method for determining the wavelength of a light source.

In an embodiment, a spectrometer for determining the wavelength of a light source designed to emit a plurality of optical pulses and an electrical synchrony signal indicating instants of emission of the optical pulses, comprises: a Geiger-mode avalanche photodiode comprising a body of semiconductor material including a first region and a second region having different types of conductivity and forming a first junction, extending in which is a first depleted region, said photodiode being configured for generating an electrical detection signal indicating instants of detection of photons of the optical pulses; electronic converter means configured for receiving the electrical detection signal and the electrical synchrony signal, and for generating an electrical delay signal, indicating delays between the instants of detection and the corresponding instants of emission; electronic memory means configured for storing a theoretical probability function correlating a probability, given an avalanche event within the photodiode, of said avalanche event having been triggered by a charge carrier generated, following upon absorption of a corresponding photon, in a portion of the photodiode including the first depleted region, with the wavelength of said corresponding photon; first electronic computing means connected to the electronic converter means and configured for determining a statistical distribution of the delays between the instants of detection and the corresponding instants of emission, on the basis of the electrical delay signal; electronic selection means configured for selecting a first portion of the statistical distribution, the delays of which approximate a Gaussian function; second electronic computing means, configured for calculating a sample value correlated to the ratio between the number of delays that fall within the first portion of the statistical distribution and the total number of delays of the statistical distribution; and estimator means configured for determining an estimate of the wavelength of the optical pulses on the basis of the theoretical probability function and of the sample value. In an embodiment, the spectrometer comprises a biasing circuit electrically connected to said first and second regions and configured for reverse biasing said first junction so that said first depleted region occupies entirely the first region. In an embodiment, the first and second regions are, respectively, of a first type of conductivity and of a second type of conductivity, and wherein the semiconductor body comprises a third region of the first type of conductivity, the second region being arranged between the first and third regions so that the second and third regions form a second junction, extending inside which is a second depleted region, which delimits, together with the first depleted region, a non-depleted portion of the second region. In an embodiment, the second region comprises a first subregion, a second subregion, and a third subregion, the second subregion being arranged between the first and third subregions, and having a doping level higher than the doping levels of the first and third subregions. In an embodiment, the second region is connected to a first reference potential. In an embodiment, the first and second regions are, respectively, of a first type of conductivity and of a second type of conductivity, and wherein the semiconductor body further comprises a third region and a fourth region, respectively, of the first and second types of conductivity, the first, second, third, and fourth regions being arranged in succession so that the third and fourth regions form a second junction. In an embodiment, the second and third regions are connected to a reference potential. In an embodiment, the semiconductor body further comprises a buffer layer, arranged between the second and third regions and having a doping level higher than the doping level of the second region.

In an embodiment, a method for determining the wavelength of a light source designed to emit a plurality of optical pulses and an electrical synchrony signal indicating instants of emission of the optical pulses, comprises: providing a Geiger-mode avalanche photodiode comprising a body of semiconductor material including a first region and a second region having different types of conductivity and forming a first junction, extending in which is a first depleted region, said photodiode being configured for generating an electrical detection signal indicating instants of detection of photons of the optical pulses; generating, on the basis of the electrical synchrony signal and of the electrical detection signal, an electrical delay signal, indicating delays between the instants of detection and the corresponding instants of emission; storing a theoretical probability function correlating a probability, given an avalanche event within the photodiode, of said avalanche event having been triggered by a charge carrier generated, following upon absorption of a corresponding photon, in a portion of the photodiode including the first depleted region, with the wavelength of said corresponding photon; determining a statistical distribution of the delays between the instants of detection and the corresponding instants of emission on the basis of the electrical delay signal; selecting a first portion of the statistical distribution, the delays of which approximate a Gaussian function; calculating a sample value correlated to the ratio between the number of delays that fall within the first portion of the statistical distribution and the total number of delays of the statistical distribution; and determining an estimate of the wavelength of the optical pulses on the basis of the theoretical probability function and of the sample value. In an embodiment, the method comprises reverse biasing the first junction so that the first depleted region occupies entirely the first region. In an embodiment, the first and second regions are, respectively, of a first type of conductivity and of a second type of conductivity, and wherein the semiconductor body comprises a third region of the first type of conductivity, the second region being arranged between the first and third regions so that the second and third regions form a second junction, extending inside which is a second depleted region; and further comprising the step of reverse biasing both the first junction and the second junction. In an embodiment, the first and second regions are, respectively, of a first type of conductivity and of a second type of conductivity, and wherein the semiconductor body further comprises a third region and a fourth region, respectively, of the first and second types of conductivity, the first, second, third, and fourth regions being arranged in succession so that the third and fourth regions form a second junction; and the method further comprises: connecting the second and third regions to a reference potential; reverse biasing the first junction; and forward biasing the second junction. In an embodiment, the step of reverse biasing the first junction comprises biasing the first junction at a voltage higher in modulus than the breakdown voltage of the first junction.

In an embodiment, a spectrometer comprises: an avalanche photodiode, including a first region and a second region having different types of conductivity and forming a first junction, the photodiode being configured to: form a first depletion region; and generate a detection signal indicative of instants of detection of photons of optical pulses; a converter configured to: receive the detection signal and a synchronization signal indicative of instants of emission of optical pulses; and generate a delay signal indicative of delays between instants of detection and corresponding instants of emission; and one or more processing devices configured to: determine a statistical distribution of delays between instants of detection and corresponding instants of emission based on the electrical delay signal; select a first portion of the statistical distribution; determine a sample value correlated to a ratio between a number of delays that fall within the first portion of the statistical distribution and a total number of delays of the statistical distribution; and estimate a wavelength of optical pulses based on stored correlation information and the sample value. In an embodiment, the spectrometer further comprises a biasing circuit electrically coupled to said first and second regions of the photodiode and configured to reverse bias said first junction so that said first depletion region occupies entirely the first region. In an embodiment, the first and second regions are, respectively, of a first type of conductivity and of a second type of conductivity; the photodiode comprises a third region of the first type of conductivity; the second region is positioned between the first and third regions; the second and third regions form a second junction; and the photodiode is configured to form a second depletion region, the first and second depletion regions defining a non-depleted portion of the second region. In an embodiment, the second region comprises a first subregion, a second subregion and a third subregion; and the second subregion is positioned between the first and third subregions and has a doping level higher than doping levels of the first and third subregions. In an embodiment, the second region is configured to couple to a first reference potential. In an embodiment, the first and second regions are, respectively, of a first type of conductivity and of a second type of conductivity; the photodiode comprises a third region and a fourth region, respectively, of the first and second types of conductivity; the first, second, third, and fourth regions are positioned in succession; and the third and fourth regions form a second junction. In an embodiment, the second and third regions are configured to couple to a reference potential. In an embodiment, the photodiode further comprises a buffer layer positioned between the second and third regions and having a doping level higher than a doping level of the second region. In an embodiment, the first portion of the statistical distribution comprises a portion approximating a Gaussian distribution and the stored correlation information is based on a theoretical function correlating a probability of an avalanche event within the photodiode having been triggered by a charge carrier generated in a portion of the photodiode including the first depletion region with a wavelength of a corresponding photon.

In an embodiment, a system comprises: an avalanche photodiode, including a first region and a second region having different types of conductivity and forming a first junction, the photodiode being configured to: form a first depletion region; and generate a detection signal indicative of instants of detection of photons of optical pulses; a converter configured to: receive the detection signal and a synchronization signal indicative of instants of emission of optical pulses; and generate a delay signal indicative of delays between instants of detection and corresponding instants of emission; one or more processing devices configured to: determine a statistical distribution of delays between instants of detection and corresponding instants of emission based on the electrical delay signal; select a first portion of the statistical distribution; determine a sample value correlated to a ratio between a number of delays that fall within the first portion of the statistical distribution and a total number of delays of the statistical distribution; and estimate a wavelength of optical pulses based on stored correlation information and the sample value; and a display coupled to the converter. In an embodiment, the first portion of the statistical distribution comprises a portion approximating a Gaussian distribution and the stored correlation information is based on a theoretical function correlating a probability of an avalanche event within the photodiode having been triggered by a charge carrier generated in a portion of the photodiode including the first depletion region with a wavelength of a corresponding photon. In an embodiment, the first and second regions are, respectively, of a first type of conductivity and of a second type of conductivity; the photodiode comprises a third region of the first type of conductivity; the second region is positioned between the first and third regions; the second and third regions form a second junction; and the photodiode is configured to form a second depletion region, the first and second depletion regions defining a non-depleted portion of the second region. In an embodiment, the second region comprises a first subregion, a second subregion and a third subregion; and the second subregion is positioned between the first and third subregions and has a doping level higher than doping levels of the first and third subregions. In an embodiment, the first and second regions are, respectively, of a first type of conductivity and of a second type of conductivity; the photodiode comprises a third region and a fourth region, respectively, of the first and second types of conductivity; the first, second, third, and fourth regions are positioned in succession; and the third and fourth regions form a second junction. In an embodiment, the photodiode further comprises a buffer layer positioned between the second and third regions and having a doping level higher than a doping level of the second region. In an embodiment, the system further comprises a coherent light source configured to generate optical pulses and the synchronization signal.

In an embodiment, a method comprises: generating, using an avalanche photodiode, a detection signal indicative of instants of detection of photons of optical pulses; generating a delay signal indicative of delays between instants of detection of photons and corresponding instants of emission of optical pulses; determining a statistical distribution of delays between the instants of detection and corresponding instants of emission based on the delay signal; selecting a first portion of the statistical distribution; calculating a sample value based on a ratio between a number of delays within the first portion of the statistical distribution and a total number of delays of the statistical distribution; and estimating a wavelength of optical pulses based on stored correlation information and the calculated sample value. In an embodiment, the generating the detection signal comprises reverse biasing a first junction between first and second regions of the avalanche photodiode to form a first depletion region, the first and second regions having different conductivity types. In an embodiment, the first depletion region occupies entirely the first region. In an embodiment, the first and second regions are, respectively, of a first type of conductivity and of a second type of conductivity; the avalanche photodiode comprises a third region of the first type of conductivity; the second region is positioned between the first and third regions; the second and third regions form a second junction; and the method comprises reverse biasing the second junction to form a second depletion region. In an embodiment, the first and second regions are, respectively, of a first type of conductivity and of a second type of conductivity; the avalanche photodiode comprises a third region and a fourth region, respectively, of the first and second types of conductivity; the first, second, third, and fourth regions are positioned in succession; the third and fourth regions form a second junction; and the method comprises: coupling the second and third regions to a reference potential; and forward biasing the second junction. In an embodiment, reverse biasing the first junction comprises biasing the first junction at a voltage higher in modulus than a breakdown voltage of the first junction. In an embodiment, the first portion of the statistical distribution comprises a portion approximating a Gaussian distribution and the stored correlation information is based on a theoretical function correlating a probability of an avalanche event within the photodiode having been triggered by a charge carrier generated in a portion of the photodiode including the first depletion region with a wavelength of a corresponding photon.

In an embodiment, a system comprises: means for generating a detection signal indicative of instants of detection of photons of optical pulses; means for generating a delay signal indicative of delays between instants of detection of photons and corresponding instants of emission of optical pulses; and means for estimating a wavelength of optical pulses based on stored correlation information and the delay signal. In an embodiment, the means for estimating is configured to: determine a statistical distribution of delays between the instants of detection and corresponding instants of emission based on the delay signal; select a first portion of the statistical distribution approximating a Gaussian distribution; calculate a sample value based on a ratio between a number of delays within the first portion of the statistical distribution and a total number of delays of the statistical distribution; and estimate the wavelength of optical pulses based on the stored correlation information and the calculated sample value. In an embodiment, the system further comprises means for generating optical pulses. In an embodiment, the means for generating the detection signal comprises an array of avalanche photodiodes.

In an embodiment, a non-transitory computer-readable medium's contents configure a processing system to perform a method, the method comprising: determining a statistical distribution of delays between instants of detection of photons of optical pulses and corresponding instants of emission of optical pulses based on a delay signal; selecting a first portion of the statistical distribution approximating a Gaussian distribution; calculating a sample value based on a ratio between a number of delays within the first portion of the statistical distribution and a total number of delays of the statistical distribution; and estimating a wavelength of optical pulses based on stored correlation information and the calculated sample value. In an embodiment, stored correlation information is based on a theoretical function correlating a probability of an avalanche event within a photodiode having been triggered by a charge carrier generated in a portion of the photodiode including a first depletion region with a wavelength of a corresponding photon.

In an embodiment, an avalanche photodiode comprises: a first region of a first type of conductivity; a second region of a second type of conductivity different from the first type of conductivity and positioned to form a first PN junction with the first region; a third region of the first type of conductivity and positioned to form a second PN junction; and a plurality of biasing terminals configured to receive reference signals to reverse bias the first PN junction and to bias the second PN junction. In an embodiment, the second and third regions are positioned to form the second PN junction and the plurality of biasing terminals are configured to receive reference signals to reverse bias the second PN junction. In an embodiment, the avalanche diode further comprises a fourth region of the second conductivity type, wherein the third and fourth regions are configured to form the second PN junction and the plurality of biasing terminals are configured to receive reference signals to forward bias the second PN junction.

BRIEF DESCRIPTION OF THE SEVERAL VIEWS OF THE DRAWINGS

For a better understanding of the disclosure, embodiments thereof are now described, purely by way of a non-limiting example and with reference to the attached drawings, wherein.

DETAILED DESCRIPTION

Figure 1:
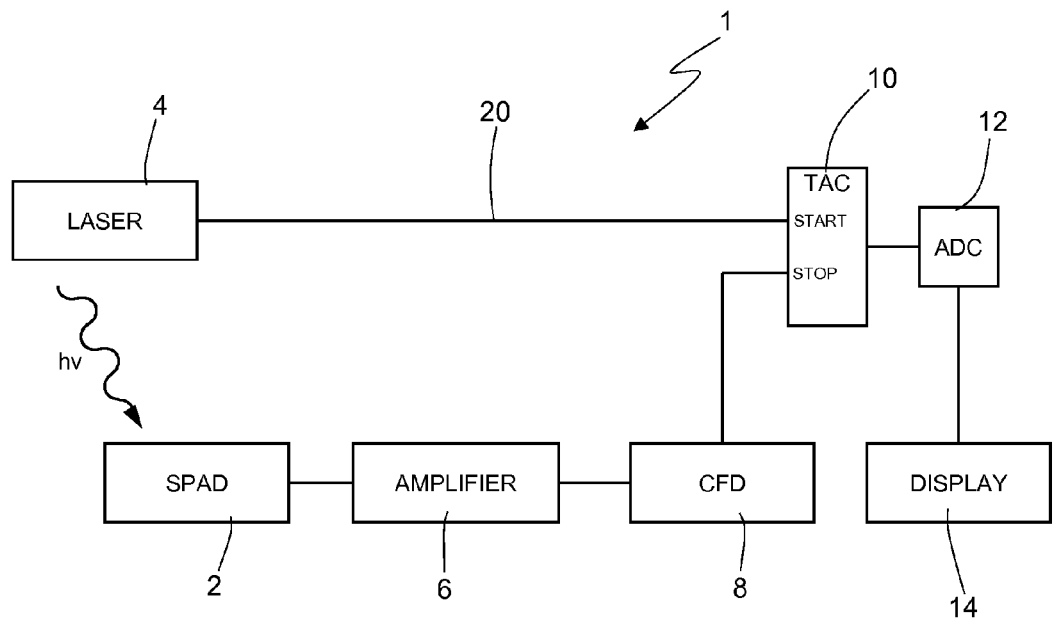
FIG. 1 shows a block diagram of a system for determining a response time of a SPAD, of a known type.

In the following description, numerous specific details are given to provide a thorough understanding of embodiments. The embodiments can be practiced without one or more of the specific details, or with other methods, components, materials, etc. In other instances, well-known structures, materials, or operations, such as, for example, processors, spectrometers, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The timing of response of an SPAD, i.e., the time required for generating an output current pulse following upon absorption of a photon, is affected chiefly by four factors: the time for collection of the charge carriers within the depleted region, typically in the region of a few picoseconds per micron of depleted region; the propagation time of the avalanche generation, e.g., the time required for the entire junction to be brought into a breakdown condition, typically in the region of a few tens of picoseconds; the time of diffusion of the charge carriers generated in the non-depleted region of the junction through the non-depleted region itself, typically comprised between a few tens of picoseconds and a few nanoseconds; and the drift time, for collection of the charge carriers on the electrodes.

In particular, as regards the time of diffusion of the charge carriers through the non-depleted region, it should be noted that in the generation of the output current there can not only concur both of the charge carriers of each electron-hole pair generated following upon absorption of a photon within the depleted region. In fact, given the reverse biasing of the junction, in the generation of the output current there concur also the minority charge carriers of the electron-hole pairs generated following upon absorption of a photon outside the depleted region, hence in a non-depleted, e.g., quasi neutral, region.

For example, assuming a junction of a PN type with the P region arranged, with respect to the direction of propagation of the photons, upstream of the N region, both the electrons of the electron-hole pairs generated in the quasi neutral portion of the P region of the junction (also known as "dead layer") and the holes of the electron-hole pairs generated in the quasi neutral portion of the N region of the junction (generally known as "epilayer") can contribute to the output current.

In practice, in the present description reference is made to "minority" charge carriers to indicate charge carriers that are in the minority in the point where they are generated, following upon absorption of a photon. For example, assuming again a region of a P type, an electron of an electron-hole pair generated following upon absorption of a photon in this P region is a minority charge carrier, whereas the corresponding hole is a majority charge carrier. Likewise, assuming a region of an N type, a hole of an electron-hole pair generated following upon absorption of a photon in this N region is a minority charge carrier, whereas the corresponding electron is a majority charge carrier.

This said, the aforementioned minority charge carriers can cause generation of corresponding output current pulses in the case where they manage to diffuse as far as the depleted region, without first recombining. However, even though the minority charge carriers of the electron-hole pairs generated outside the depleted region can contribute also to photon detection, they require, in order to be able to reach the depleted region, diffusion times that generally range (according to the point of generation and to the doping level) from a few tens of picoseconds to a few nanoseconds. Hence, the charge carriers generated in the avalanche events triggered thereby can be collected at the anode and cathode electrodes with considerable delays. Consequently, there occurs a deterioration of the response time of the SPAD; in particular, there occurs generation, in the output current, of the so-called "diffusion tail".

For practical purposes, usually the response time of the SPAD is defined on the basis of the temporal jitter between the effective arrival of the photon and the instant in which the corresponding pulse of the output current occurs.

In greater detail, it is possible to resort to the detection system 1 illustrated in FIG. 1, where the SPAD is designated by 2. In addition to the SPAD 2, the detection system 1 comprises a laser 4, a pre-amplifier 6, a constant fraction discriminator (CFD) 8, a time-to-amplitude converter (TAC) 10, an analog-to-digital converter (ADC) 12, and a display screen 14.

The laser 4 is, for example, of a pulsed type and is designed to emit optical pulses of the duration of a few picoseconds;

moreover, the laser 4 is electrically connected, for example, using a coaxial cable 20, to a first input terminal START of the time-to-amplitude converter 10. For example, the laser 4 can send to the first input terminal START a first driving signal, indicating instants of emission of corresponding optical pulses. For example, the laser 4 can send an electrical pulse to the first input terminal START whenever it emits an optical pulse.

In addition, the laser 4 is optically connected to the SPAD 2, for example, using an optical fiber and a collimating lens (not illustrated), so that the SPAD 2 receives the optical pulses generated by the laser 4.

The SPAD 2 is electrically connected to the input of the pre-amplifier 6, the output of which is connected to the input of the constant fraction discriminator 8. The output of the constant fraction discriminator 8 is connected to a second input terminal STOP of the time-to-amplitude converter 10. The output of the time-to-amplitude converter 10 is connected to the input of the analog-to-digital converter 12, the output of which is connected to the display screen 14.

Operatively, referring to the output current generated by the SPAD 2 as to the photodiode signal, the pre-amplifier 6 amplifies the photodiode signal, by generating a pre-amplified signal. The constant fraction discriminator 8 generates a second driving signal, indicating the instants of detection of photons by the SPAD 2. For this purpose, the constant fraction discriminator 8 may, for example, compare the pre-amplified signal with a threshold, and send an electrical pulse to the second input terminal STOP of the time-to-amplitude converter 10 whenever the pre-amplified signal happens to overstep the threshold. This electrical pulse indicates the detection of a photon by the SPAD 2, as well as the corresponding instant of detection.

Referring to the electrical pulses of the first driving signal sent by the laser 4 to the first input terminal START as to the emission pulses, and referring to the electrical pulses of the second driving signal sent by the constant fraction discriminator 8 to the second input terminal STOP as to the detection pulses, to each emission pulse there can correspond a detection pulse. In the case where to a given emission pulse there corresponds a respective detection pulse, it means that a photon of the optical pulse emitted by the laser 4 and corresponding to the given emission pulse has been detected by the SPAD 2. In other words, it means that this optical pulse has been detected by the SPAD 2. Furthermore, for the reasons mentioned previously, the detection pulse is delayed with respect to the emission pulse.

The time-to-amplitude converter 10 generates a delay signal of an analog type, which, given any time interval, indicates the delays in time present between the detection pulses received during the time interval and the corresponding emission pulses. In other words, for each photon detected, the delay signal indicates a corresponding time delay.

The delay signal is then digitized by the analog-to-digital converter 12, and the digitized signal is finally displayed on the display screen 14.

Figure 2:
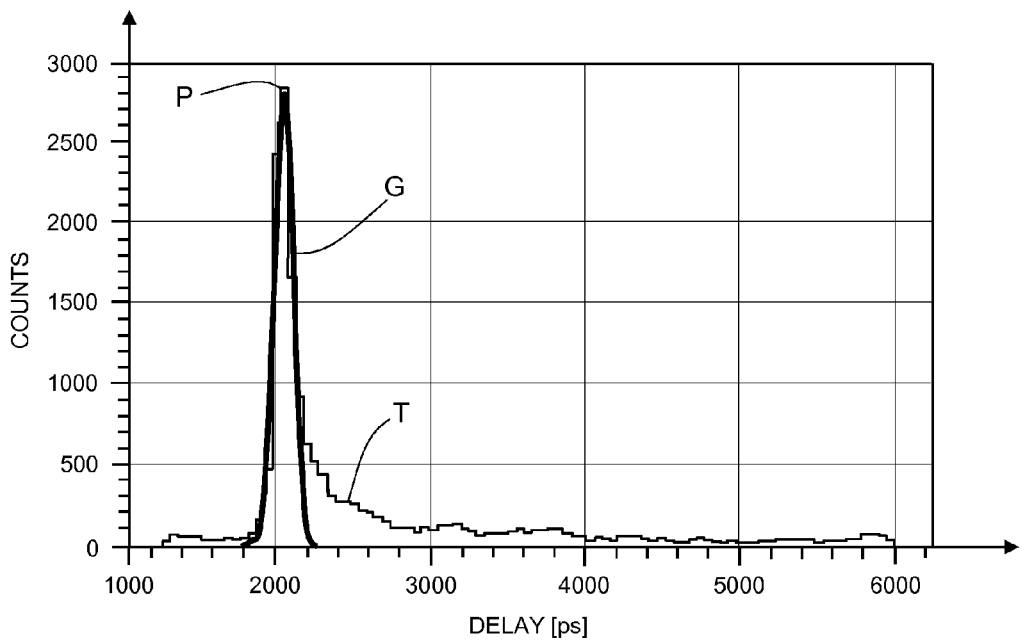
FIG. 2 shows an example of time spectrum of a SPAD of a known type.

FIG. 2 shows an example of a histogram, which is a possible representation on the display screen 14 of the digitized signal.

In practice, each class of the histogram has an amplitude equal to a temporal discretization $\Delta$ and extends between a corresponding minimum time $t_{min}$ and a corresponding maximum time $t_{max}+\Delta$. Furthermore, following upon the emission of a certain number of optical pulses by the laser 4 during a certain time interval, each class has a height equal to a corresponding number; in the case in point, considering an i-th class extending between $t_{min\_i}$ and $t_{max\_i}$, the corresponding height $h_i$ is equal to the number of delays comprised between $t_{min\_i}$ and $t_{max\_i}$, as may be inferred on the basis of the delay signal.

In practice, the histogram described illustrates a statistical distribution of the delays between the emission pulses and the corresponding detection pulses. Said statistical distribution is also known as time response of the SPAD 2, or as time spectrum of the SPAD 2.

In general, the time spectrum of the SPAD 2 includes a first portion, i.e., a first set of contiguous classes, which define a peak P. The height of each class of this first portion is principally caused by the photons absorbed in the depletion region of the junction of the SPAD 2. Furthermore, the heights of this first portion define a sort of curve, with regard to which it is possible to establish a peak width, i.e., a temporal quantity indicating the statistical dispersion of the delays that fall within the first portion itself. In practice, the peak width depends chiefly upon the statistical jitter of the propagation time of the avalanche, the latter being also known as build-up time.

The first portion of the time spectrum of the SPAD 2 can be interpolated by using a Gaussian function G, on the basis of which the response time of the SPAD 2 can then be defined. Usually, the response time is set equal to the standard deviation or to the full width at half maximum (FWHM) of the Gaussian function G.

In greater detail, the width of the Gaussian function G depends not only upon the propagation time of the avalanche but also upon the aforementioned time for collection of the charge carriers within the depleted region and the aforementioned drift time of the charge carriers through the non-depleted region of the junction, the latter time in turn depending upon the series resistance of the junction, the parasitic capacitance, and the depletion capacitance of the junction. Typical values of the response time are around between one hundred and two hundred picoseconds.

The time spectrum of the SPAD 2 moreover includes a second portion, subsequent to the first portion and formed by a second set of contiguous classes, the second portion being generally known as the tail T. In practice, the first and second portions of the time spectrum are identifiable by means of mathematical algorithms that detect the correspondence thereof, respectively, to a Gaussian law and to an exponential law.

The tail T is caused by absorption of photons in the quasi neutral portions of the P and N regions of the junction, and in particular by the minority charge carriers consequently generated. The tail T hence depends upon the wavelength of the optical pulses generated by the laser 4.

More precisely, some of the minority charge carriers generated following upon absorption of photons in the quasi neutral portions of the P and N regions of the junction contribute to forming the first portion of the time spectrum of the SPAD 2, and not the second portion, in the case where they manage to reach the depleted region and trigger corresponding avalanche events.

Figure 3:
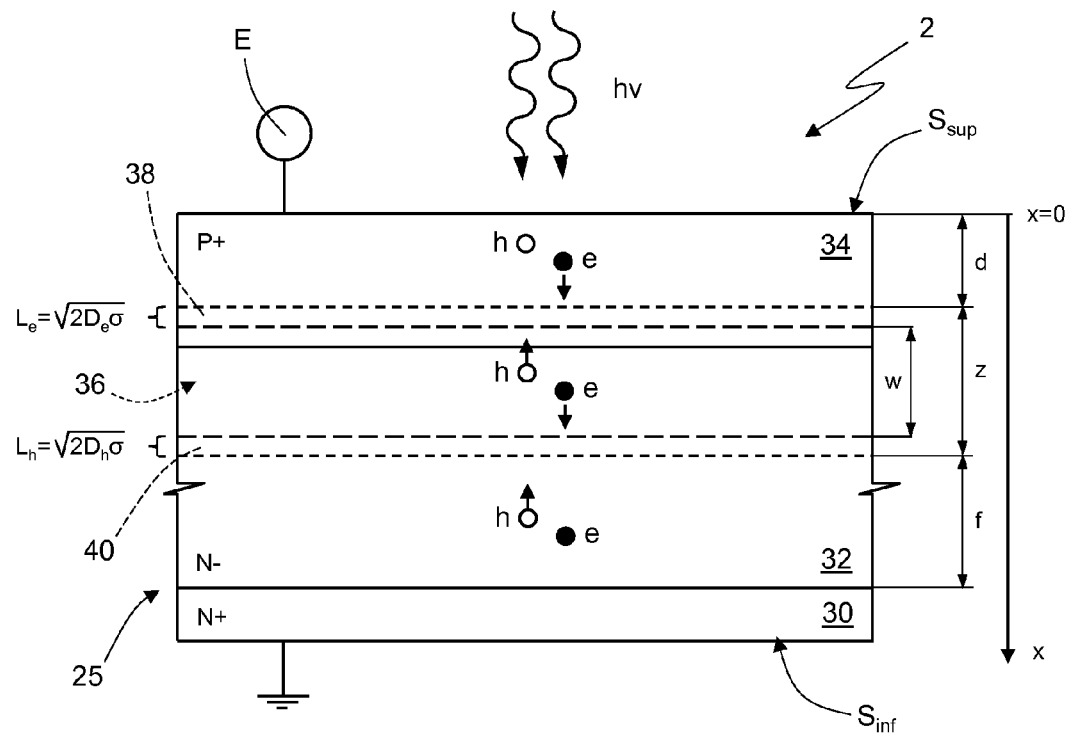
FIG. 3 is a schematic cross-sectional view of a SPAD of a known type.

In this connection, as illustrated in FIG. 3, by way of example, a SPAD 2 comprises a body 25 made of semiconductor material, which is formed by a substrate 30 of semiconductor material (for example, silicon) of an N+ type, a first epitaxial layer 32, which is arranged on top of the substrate 30 and is of an N− type, and a second epitaxial layer 34, which is arranged on top of the first epitaxial layer 32 and is of a P+ type. In practice, the first and second epitaxial layers 32, 34 define, respectively, the N region and the P region of the junction, also known as cathode region and anode region.

The body 25 is delimited at the top and at the bottom by a first and a second surface $S_{sup}$, $S_{inf}$. Furthermore, the SPAD 2 comprises an electrode E, connected to the second epitaxial layer 34; the substrate 30 may be connected to ground, so that, by setting the electrode E at a negative potential, the junction is reverse biased.

This said, some of the electrons generated following upon absorption of a photon in the quasi neutral portion of the anode region 34 can concur in formation of the first portion of the time spectrum of the SPAD 2, and are hence concur to the determination of the Gaussian function G. These are, in particular, electrons of the electron-hole pairs that have formed following upon absorption of photons in the part of the quasi neutral portion of the anode region 34 that extends in contact with the depleted region (here designated by 36 and having a thickness w) and has a thickness $L_e$. In what follows, said part of the quasi neutral portion of the anode region, designated by 38 is referred to as "first proximal region".

Likewise, some of the holes generated following upon absorption of a photon in the quasi neutral portion of the cathode region 32 can concur in the formation of the first portion of the time spectrum of the SPAD 2 and are hence a consideration for the purposes of calculation of the Gaussian function G. These are, in particular, holes of the electron-hole pairs that have formed following upon absorption of photons in the part of the quasi neutral portion of the cathode region 32, which extends in contact with the depleted region 36 and has a thickness $L_h$; in what follows, this part of the quasi neutral portion of the cathode region, designated by 40, is referred to as "second proximal region".

In particular, it is possible to show that $L_e = (2D_e \sigma)^{1/2}$ and $L_h = (2D_h \sigma)^{1/2}$, where $D_e$ and $D_h$ designate, respectively, the lengths of diffusion of the electrons and of the holes, whilst σ designates the standard deviation of the Gaussian function G that interpolates the first portion of the time spectrum. Typically, the lengths $L_e$ and $L_h$ are in the region of a few tenths of microns.

In practice, given the proximity of the first and second proximal regions 38, 40 to the depleted region 36, the avalanche events triggered by electrons and holes that are generated, respectively, in the first proximal region 38 and in the second proximal region 40, which then reach the depleted region 36, are not temporally distinguishable, within the time spectrum of the SPAD 2, from the avalanche events triggered by electrons and holes generated directly within the depleted region 36. Consequently, in order to discriminate which charge carriers contribute to the determination of the Gaussian function G and which to the tail T, it is more correct to refer to an effective depleted region, which includes the depleted region 36 and the first and second proximal regions 38, 40.

In even greater detail, as mentioned previously, not all the charge carriers generated in the quasi neutral regions of the junction manage to reach the depleted region on account of the recombination processes of an Auger or Shockley-Read-Hall type. Furthermore, not all the charge carriers that manage to reach the depleted region trigger an avalanche event since each of them has a non-zero probability of losing energy in the interaction with the crystalline lattice and consequently of recombining before the entire junction is brought into breakdown.

In particular, assuming a Cartesian reference system such that the SPAD 2 extends along the axis x and if x=0 corresponds to the first surface $S_{sup}$ of the second epitaxial layer 34, it is possible to designate by d the thickness of the portion of the second epitaxial layer 34 not occupied by the first proximal region 38 or by the depleted region 36. Furthermore, it is possible to designate, respectively, by z and f the thickness of the effective depleted region and the thickness of the portion of the first epitaxial layer 32 not occupied by the second proximal region 40 or by the depleted region 36.

This said, the portions of the SPAD 2 extending, respectively, between [0;d], [d;d+z] and [d+z;d+z+f] are referred to as first, second, and third absorption regions, the Lambert-Beer's law enables estimation of the probability $A_1$-$A_3$ of absorption of a photon, respectively, in the first, second, and third absorption regions. In particular, we have:

$$\int_0^d \alpha e^{-\alpha x} dx = 1 - e^{-\alpha d} = A_1$$

$$\int_d^{d+z} \alpha e^{-\alpha x} dx = e^{-\alpha d} - e^{-\alpha(d+z)} = A_2$$

$$\int_{d+z}^{d+z+f} \alpha e^{-\alpha x} dx = e^{-\alpha(d+z)} - e^{-\alpha(d+z+f)} = A_3$$

where α is the coefficient of absorption of the semiconductor material of which the SPAD 2 is formed (for example, silicon), at the wavelength of the optical pulses generated by the laser 4. For example, FIG. 4 shows the plots, as a function of the wavelength, of the probabilities $A_1$-$A_3$, for the case where the SPAD 2 is made of silicon and we have d=3 μm, z=1 μm and f is infinite.

Figure 4:
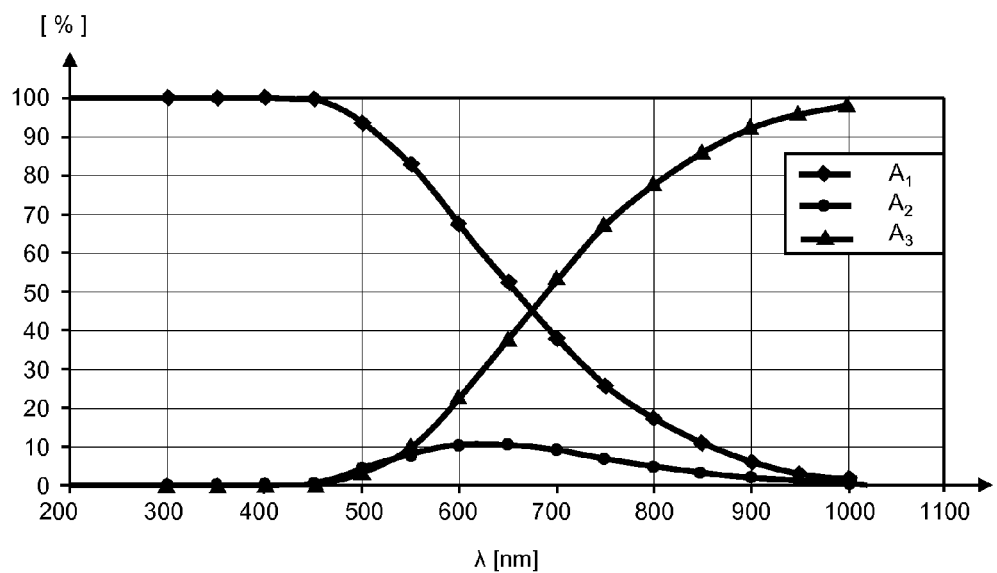
FIG. 4 shows theoretical plots of the probability of absorption of a photon in three different regions of a SPAD of a known type, as the wavelength of the photon varies.

As illustrated precisely in FIG. 4, the probabilities $A_1$ and $A_3$ have opposite profiles as the wavelength increases since, as the wavelength increases, the probability of a photon being absorbed in the first absorption region decreases, whereas the probability of absorption in the third absorption region increases. Instead, the probability of a photon being absorbed in the second absorption region, i.e., in the effective depleted region, follows a bell profile; hence it exhibits a maximum.

In practice, it is not possible to distinguish, on the basis of the time spectrum of the SPAD 2, between minority charge carriers generated by photons absorbed in the first absorption region or else in the third absorption region. In fact, in either case, the minority charge carriers trigger avalanche events with a certain delay with respect to the avalanche events triggered by the charge carriers generated following upon absorption of photons in the second absorption region, i.e., in the effective depleted region.

Figure 5:
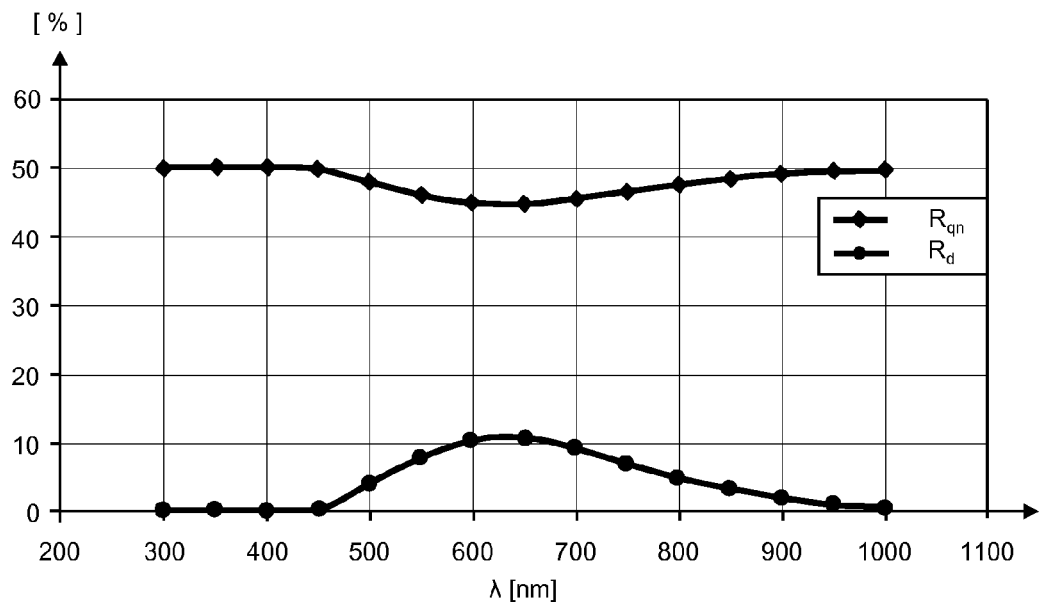
FIG. 5 shows theoretical plots of the probability of triggering avalanche events by charge carriers generated following upon incidence of a photon on a SPAD of a known type, as the wavelength of the photon varies and for two different regions of absorption of the photon within the photodiode.

In detail, it is possible to calculate the percentage $R_{qn}$ of avalanche events triggered by minority charge carriers generated in the first absorption region or in the third absorption region with respect to a total number of photons incident on the SPAD 2, as well as the percentage $R_d$ of avalanche events triggered by charge carriers generated in the second absorption region with respect to the total number of incident photons, obtaining what is illustrated in FIG. 5.

In particular, the curve for the percentage $R_{qn}$ is obtained as sum of the probabilities $A_1$ and $A_3$, and subsequent multiplication by a scale factor of 0.5. This scale factor has the function of considering the possibility that a part of the minority charge carriers generated in the first and third absorption regions does not reach the depleted region, or that in any case, albeit reaching the depleted region, does not trigger any avalanche. A corresponding scale factor has not been used for calculating the percentage $R_d$, or rather the scale factor is assumed to be unity; hence it is assumed that all the charge carriers generated in the effective depleted region trigger avalanche events.

In practice, the percentages $R_d$, $R_{qn}$ represent the probabilities, given an incident photon, of there occurring an avalanche event caused by a charge carrier generated by absorption of the incident photon, respectively, in the effective depleted region or in the ensemble formed by the first and third absorption regions, i.e., in the ensemble of the parts of the quasi neutral portions of the anode and cathode regions other than the first and second proximal regions 38, 40.

Figure 6:
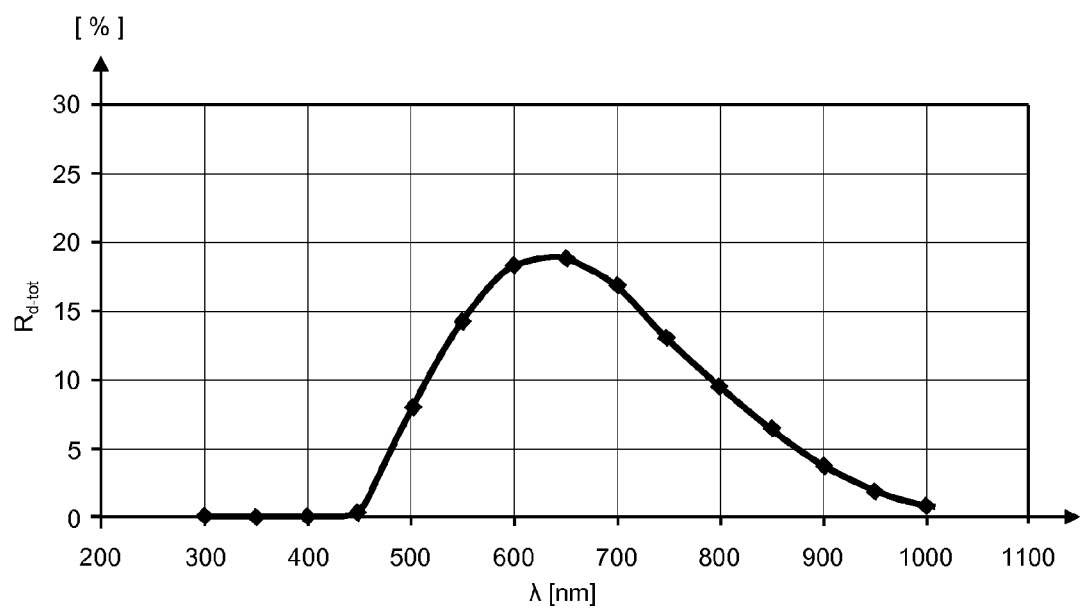
FIG. 6 shows the theoretical plot of the ratio between a number of avalanche events triggered by charge carriers generated following upon absorption of a photon in a region of a SPAD of a known type and the total number of avalanche events triggered.

It is moreover possible to calculate, for each value of wavelength, the ratio between the corresponding percentage $R_d$ and the sum of the percentage $R_d$ with the corresponding percentage $R_{qn}$, obtaining a percentage $R_{d\text{-}tot}$ of the type illustrated in FIG. 6. In practice, the percentage $R_{d\text{-}tot}$, which can theoretically be calculated in the way described, assumes a bell profile and represents the ratio between the number of avalanche events triggered by charge carriers generated in the effective depleted region and the total number of avalanche events. Equivalently, the percentage $R_{d\text{-}tot}$ represents the probability, given an avalanche event, of it having been generated by a charge carrier generated following upon absorption of a photon in the effective depleted region.

All this having been said, by having available the time spectrum of the SPAD 2 illustrated in FIG. 2 and obtained experimentally, it is possible to determine an experimental percentage value $R_{d\text{-}tot\_exp}$, equal to the ratio between the sum of the heights of the classes of the first portion of the time spectrum and the sum of the heights of all the classes of the time spectrum of the SPAD 2. The experimental percentage value $R_{d\text{-}tot\_exp}$ yields an experimental estimate of the percentage $R_{d\text{-}tot}$ related to the wavelength of the laser 4.

The experimental percentage value $R_{d\text{-}tot\_exp}$ indicates the response time of the SPAD 2; however, it does not enable any information on the wavelength 4 to be inferred, if the latter is unknown. In fact, if the wavelength of the laser 4 is unknown, even by having available the experimental percentage value $R_{d\text{-}tot\_exp}$ and theoretical values of the percentage $R_{d\text{-}tot}$ for a certain number of wavelengths, it is not possible to correlate usefully the experimental percentage value $R_{d\text{-}tot\_exp}$ and the theoretical values of the percentage $R_{d\text{-}tot}$ in order to determine the wavelength of the laser 4. In fact, even assuming that we have a theoretical curve of the percentage $R_{d\text{-}tot}$ for any wavelength, each point of this theoretical curve corresponds, on account of the bell profile, to two different wavelengths. Consequently, it is not possible to carry out a unique search of the wavelength that corresponds, given the theoretical curve of the percentage $R_{d\text{-}tot}$, to the experimental percentage value $R_{d\text{-}tot\_exp}$.

In practice, the detection system 1 implements the so-called "time-correlated single-photon counting" (TCSPC) technique, which enables response times of the SPADs to be obtained with a temporal resolution of the order of picoseconds. However, it does not enable determination of the wavelength of the laser 4 if this is unknown.

Consequently, if the wavelength of the laser 4, or of any other light source performing the function of the laser 4 (for example, a fluorescent molecule), is unknown, to determine this wavelength it is necessary to resort to spectrometric systems additional to the detection system 1, with consequent increase of the complexity and reduction of the possibilities of integration.

Similar considerations can be made for the case where, instead of the SPAD 2, the detection system 1 presents a so-called array of SPADs, and in particular a so-called "silicon photomultiplier" (SiPM).

In detail, an SiPM is an array of SPADs, formed by a matrix of SPADs grown on one and the same substrate and provided with respective quenching resistors (for example, of a vertical type) integrated in the SPADs, these quenching resistors being decoupled from and independent of one another. Furthermore, the anode and cathode electrodes of each SPAD are configured so as to be able to be connected to a single voltage generator.

Consequently, the SPADs of the SiPM can be biased at one and the same reverse-biasing voltage $V_A$; moreover, the avalanche currents generated inside them are multiplexed together so as to generate an output signal of the SiPM equal to the summation of the output signals of the SPADs.

In practice, the SiPM is a device with a large area and high gain, capable of supplying, on average, an electrical output signal (current) proportional to the number of photons that impinge upon the SiPM; however, SiPMs present the same drawbacks as the SPADs that make them up.

In general, an embodiment of a spectrometer includes a Geiger-mode avalanche photodiode in conditions such as to reduce substantially the triggering of avalanche events by at least one species of charge carriers between i) the minority charge carriers generated following upon absorption of a photon in a quasi neutral region overlying the depleted region and ii) the minority charge carriers generated following upon absorption of a photon in a quasi neutral region underlying the depleted region, as described hereinafter.

Figure 7:
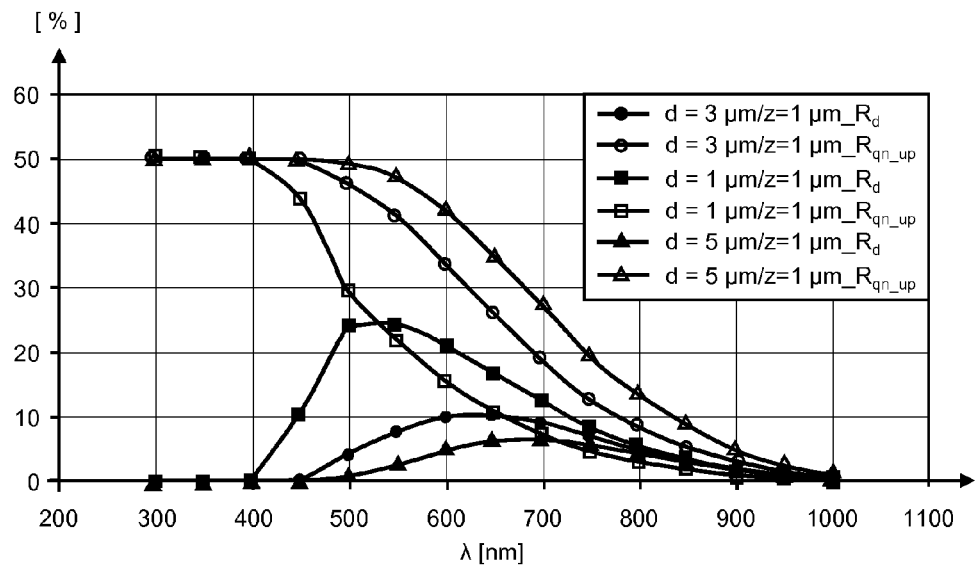
FIG. 7 shows three theoretical plots of the probability of triggering avalanche events by charge carriers generated following upon incidence of a photon on a SPAD, as the wavelength of the photon varies and for a first region and a second region of absorption of the photon within the SPAD, on the hypothesis of suppressing the contribution to the triggering of avalanche events by charge carriers generated in a third absorption region of the SPAD.

Before describing embodiments of the present spectrometer in greater detail, with reference, by way of example, to the SPAD 2 illustrated in FIG. 3, FIG. 7 shows the theoretical plots, as the wavelength of the photon varies, of the percentage $R_{qn\_up}$ of avalanche events triggered by minority charge carriers generated in the part of the quasi neutral portion of the anode region 34 arranged on top of the effective depleted region, with respect to a total number of photons incident on the SPAD 2, and on the hypothesis that no avalanche event is triggered by minority charge carriers generated in the part of the quasi neutral portion of the cathode region 32 arranged underneath the effective depleted region. The theoretical plots of the percentage $R_{qn\_up}$ are given for the cases where we have respectively: d=3 μm, z=1 μm; d=1 μm, z=1 μm; and d=5 μm, z=1 μm.

In addition, FIG. 7 shows the theoretical plots of the percentage $R_d$ of avalanche events triggered by charge carriers generated in the effective depleted region, with respect to the total number of incident photons, for the same cases to which the theoretical plots of the percentage $R_{qn\_up}$ refer. Furthermore, as has been said in connection with FIG. 5, there has again been assumed a scale factor of 0.5 for the percentage $R_{qn\_up}$, and a unit scale factor for the percentage $R_d$. It is hence hypothesized that only half of the minority charge carriers generated in the part of the quasi neutral portion of the anode region 34 arranged on top of the effective depleted region effectively trigger avalanche events, and that all the charge carriers generated in the effective depleted region trigger corresponding avalanche events.

It should be noted that the curves illustrated in FIG. 7 refer to hypothetical avalanche events triggered during a time window of arbitrary duration. The percentages $R_d$ and $R_{qn\_up}$ illustrated in FIG. 7 can consequently be interpreted also as corresponding probabilities, given an incident photon, of there occurring an avalanche event caused by a charge carrier generated by absorption of the incident photon, respectively, in the effective depleted region or in the part of the quasi neutral portion of the anode region 34 arranged on top of the effective depleted region, i.e., in the quasi neutral portion of the anode region 34, except for the first proximal region 38.

Figure 8:
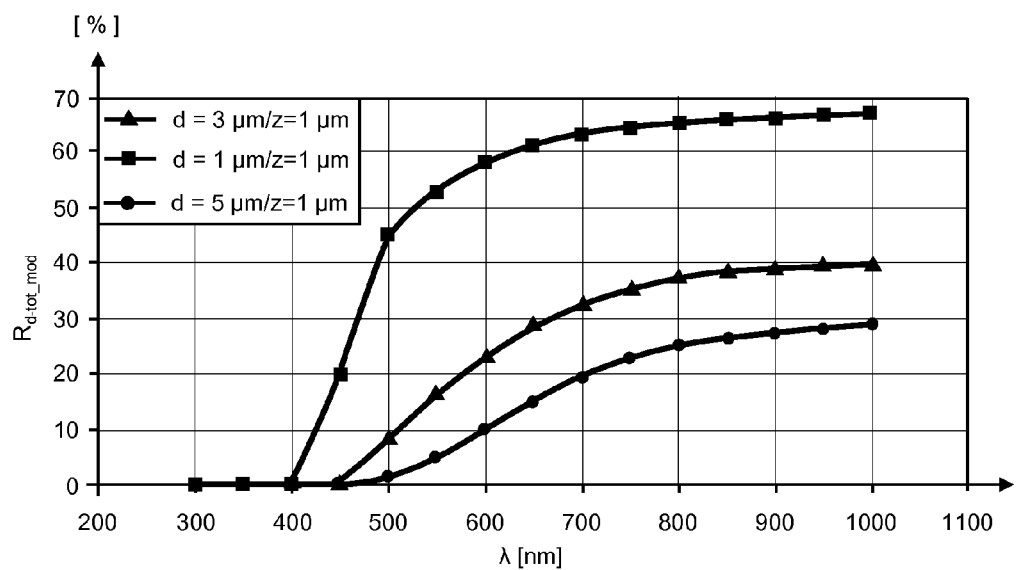
FIG. 8 shows three theoretical plots of the ratio between a number of avalanche events triggered by charge carriers generated following upon absorption of a photon in an absorption region of a SPAD and a total number of avalanche events, on the same hypothesis adopted in FIG. 7.

As illustrated in FIG. 8, it is hence possible to calculate a theoretical function for the ratio $R_{d\text{-}tot\_mod}$ between the number of avalanche events triggered by charge carriers generated in the effective depleted region, as if they occurred, for example, during a time window of arbitrary duration, and the corresponding total number of avalanche events triggered in the same time window; equivalently, the ratio $R_{d\text{-}tot\_mod}$ can be interpreted as the probability that, given an avalanche event, this latter has been triggered by a charge carrier generated in the effective depleted region, once again on the hypothesis that no avalanche event is triggered by minority charge carriers generated in the part of the quasi neutral portion of the cathode region 32 arranged underneath the effective depleted region. For practical purposes, it is possible to calculate the ratio between the percentage $R_d$ and the sum of the percentage $R_d$ and the percentage $R_{qn\_up}$.

The theoretical function that describes the ratio $R_{d\text{-}tot\_mod}$ as the wavelength of the photon varies is not necessarily discrete, since, even assuming having calculated the percentages $R_{qn\_up}$ and $R_d$, and consequently the ratio $R_{d\text{-}tot\_mod}$, for a limited number of wavelength values, it is possible to make a subsequent interpolation of the values of the ratio $R_{d\text{-}tot\_mod}$ thus obtained. It should moreover be noted that FIG. 8 represents three plots of the ratio $R_{d\text{-}tot\_mod}$ for the cases where we have respectively: d=3 µm, z=1 µm; d=1 µm, z=1 µm; and d=5 µm, z=1 µm.

As emerges from FIG. 8, the theoretical function that describes the ratio $R_{d\text{-}tot\_mod}$ increases monotonically with the wavelength; hence, it may be usefully adopted to infer information regarding the wavelength itself, as described hereinafter. The profile and, hence, the slope of this theoretical function can be varied by modifying the thicknesses of the effective depleted region and of the part of the quasi neutral portion of the anode region 34 arranged on top of the effective depleted region. For example, by increasing the thickness of the part of the quasi neutral portion of the anode region 34 arranged on top of the effective depleted region, an increase in the wavelength at which a saturation of the theoretical function occurs is obtained.

Figure 9A:
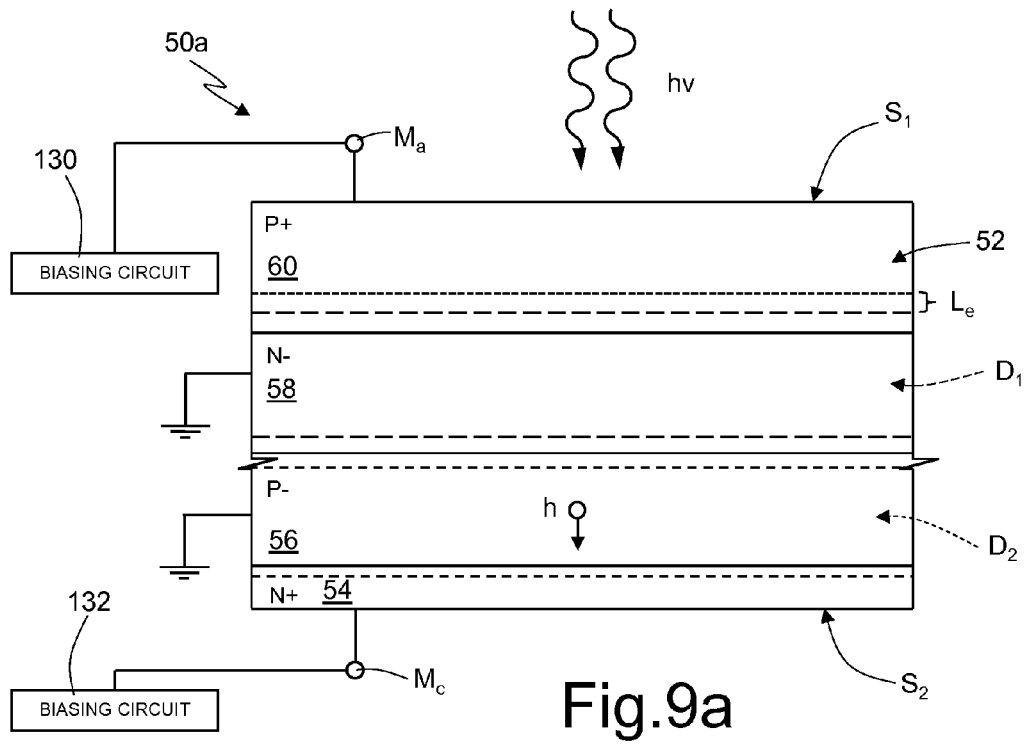
FIGS. 9a, 9b, 10a, 10b and 14 are schematic cross-sectional views of Geiger-mode avalanche photodiodes and corresponding biasing circuits.

All this having been said, FIG. 9a shows a first photodiode of the avalanche type operating in Geiger mode, referred to hereinafter as "first photodiode 50a". The first photodiode 50a can be included within the present spectrometer, since, as clarified hereinafter, a theoretical function can be calculated for it, which describes the ratio $R_{d\text{-}tot\_mod}$ and is monotonic as the wavelength varies, i.e., is of the type shown in FIG. 8.

In detail, the first photodiode 50a comprises a semiconductor body 52 formed by a substrate 54 and by a first epitaxial layer 56, a second epitaxial layer 58, and a third epitaxial layer 60.

The substrate 54 may, for example, be of an N+ type, with doping level comprised between $10^{19}$ cm$^{-3}$ and $10^{20}$ cm$^{-3}$ and a thickness, for example, comprised between 100 µm and 500 µm (FIG. 9a is not in scale).

The first, second, and third epitaxial layers 56-60 may be, respectively, of a P− type, an N− type, and a P+ type. Furthermore, once again by way of example, the first epitaxial layer 56 may have a thickness comprised between 1 µm and 20 µm, as well as a doping level comprised between $10^{16}$ cm$^{-3}$ and $10^{17}$ cm$^3$. The second epitaxial layer 58 may have a thickness comprised between 1 µm and 3 µm, and a doping level comprised between $10^{16}$ cm$^{-3}$ and $10^{17}$ cm$^{-3}$. Finally, the third epitaxial layer 60 may have a thickness comprised between 1 µm and 5 µm, and a doping level comprised between $10^{19}$ cm$^{-3}$ and $10^{20}$ cm$^{-3}$.

In greater detail, the third epitaxial layer 60 and the substrate 54 define, respectively, a top surface $S_1$ and a bottom surface $S_2$ of the semiconductor body 52. Furthermore, the first photodiode 50a comprises an anode electrode and a cathode electrode $M_a$ and $M_c$ (illustrated symbolically), which are, respectively, connected to the third epitaxial layer 60 and to the substrate 54. In addition, the first and second epitaxial layers 56, 58 are connected to ground.

Even though not illustrated, the first photodiode 50 may include, in a way in itself known, a guard ring, one or more antireflection layers, as well as a trench filled with conductive material, in order to insulate the first photodiode 50a itself optically. There may also be present a quenching resistor (not illustrated). In addition, the first epitaxial layer 56 may be connected to ground using a sinker region, for example, formed by means of implantation and subsequent diffusion of boron atoms through the top surface $S_1$. Likewise, the second epitaxial layer 58 may be connected to ground using a further sinker region, for example, formed by implantation and subsequent diffusion of phosphorus atoms through the top surface $S_1$.

In practice, the first photodiode 50a includes a first junction, formed by the second and third epitaxial layers 58, 60, and a second junction, formed by the substrate 54 and by the first epitaxial layer 56. The second and third epitaxial layers 58, 60 form, respectively, the cathode region and the anode region of the first junction; the substrate 54 and the first epitaxial layer 56 form, respectively, the cathode region and the anode region of the second junction. The first and second junctions are arranged on top of one another.

In use, the third epitaxial layer 60 and the substrate 54 are set, respectively, using the anode electrode $M_a$ and cathode electrode $M_c$, at a first potential $V_1$ and a second potential $V_2$, both negative. For instance, the first and second potentials $V_1$ and $V_2$ can be imposed by a first biasing circuit 130 and a second biasing circuit 132, connected to ground and, respectively, to the anode electrode $M_a$ and to the cathode electrode $M_c$.

In particular, the first potential $V_1$ is such that the first junction is reverse biased and operates in Geiger mode. The second potential $V_2$ is such that the second junction is forward biased, for example, with a difference of potential of 1 V. Even more in particular, the thicknesses and the doping of the first, second, and third epitaxial layers 56, 58 and 60 are such that, referring to the first and second depleted regions (designated by $D_1$, $D_2$) to indicate, respectively, the depleted regions of the first and second junctions, we find that, when $V_1=-30$ V and $V_2=1$ V, the first and second depleted regions $D_1$, $D_2$ are separate, but the distance between them is not greater than 0.2 µm.

Consequently, the quasi neutral portions of the first and second epitaxial layers 56, 58 have particularly limited thicknesses, with consequent reduction of the probability of absorption of photons within them. Consequently, also the probability of holes being generated in the quasi neutral portion of the second epitaxial layer 58 is reduced.

As regards the holes of the electron-hole pairs that can be generated following upon absorption of photons in the second depleted region $D_2$, given the forward biasing of the second junction, they are collected at the cathode electrode $M_c$, without being able to reach the first depleted region $D_1$. Furthermore, the (majority) electrons injected in the anode region of the second junction (i.e., in the first epitaxial layer 56) are not able to trigger avalanche events in the first junction because the latter is reverse biased. Consequently, the theoretical function that describes the ratio $R_{d\text{-}tot\_mod}$ for the first photodiode 50a is of the type shown in FIG. 8.

In practice, the second epitaxial layer 58 may have a sufficiently low doping level, such as to enable almost total depletion thereof even in the presence of not particularly high biasing voltages, without this leading to an excessive increase in the breakdown voltage $V_B$.

Figure 9B:
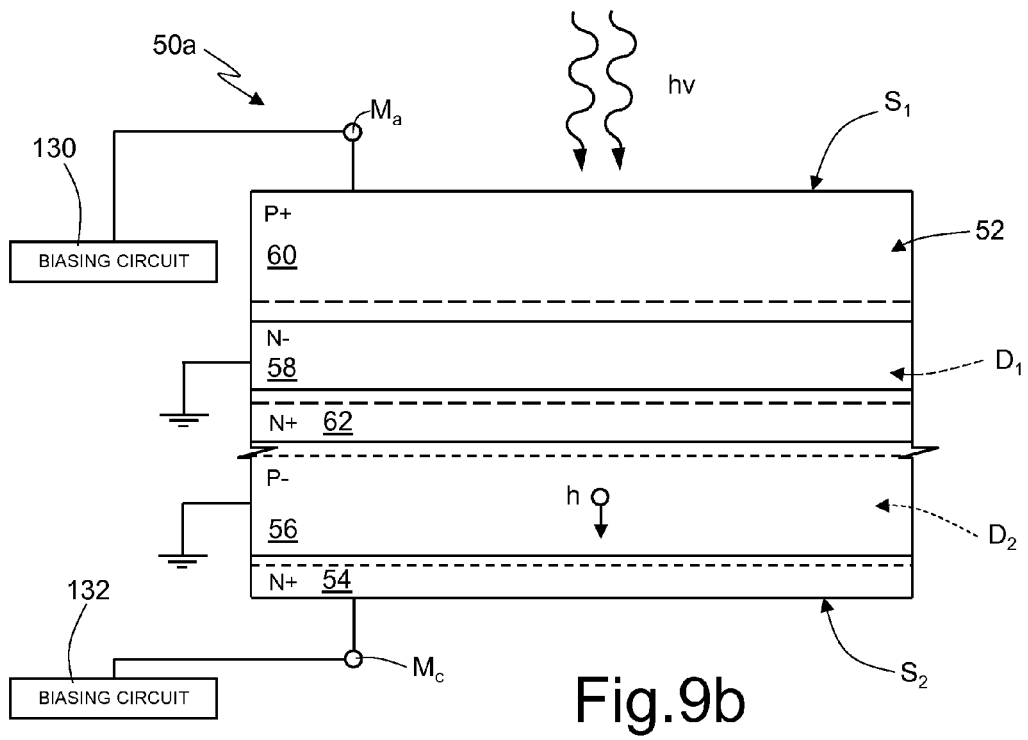

As illustrated in FIG. 9b, in order to prevent contact between the first and second depleted regions $D_1$, $D_2$, the first photodiode 50a may further comprise a buffer layer 62, for example, of an N+ type, arranged between the first and second epitaxial layers 56, 58. For example, the buffer layer 62 may have a thickness comprised between 0.2 µm and 0.5 µm, and a doping level comprised between $10^{19}$ cm$^{-3}$ and $10^{20}$ cm$^{-3}$.

In this case, it is possible to bias the first photodiode 50a in such a way that the first depleted region $D_1$ extends underneath through the entire second epitaxial layer 58, as far as into a top portion of the buffer layer 62. Consequently, the thickness of the second epitaxial layer 58 can be increased since the electrical field is in any case confined by the buffer layer 62. Consequently, the incidence of the charge carriers generated in the first depleted region $D_1$ in triggering avalanche events is increased as compared to the incidence of the holes generated in the quasi neutral portion of the buffer layer 62, which, besides, has a very small thickness. In addition, given the high doping level, the probability of any holes that are generated in the quasi neutral portion of the buffer layer 62 recombining before they reach the first depleted region $D_1$ is very high.

Figure 10A:
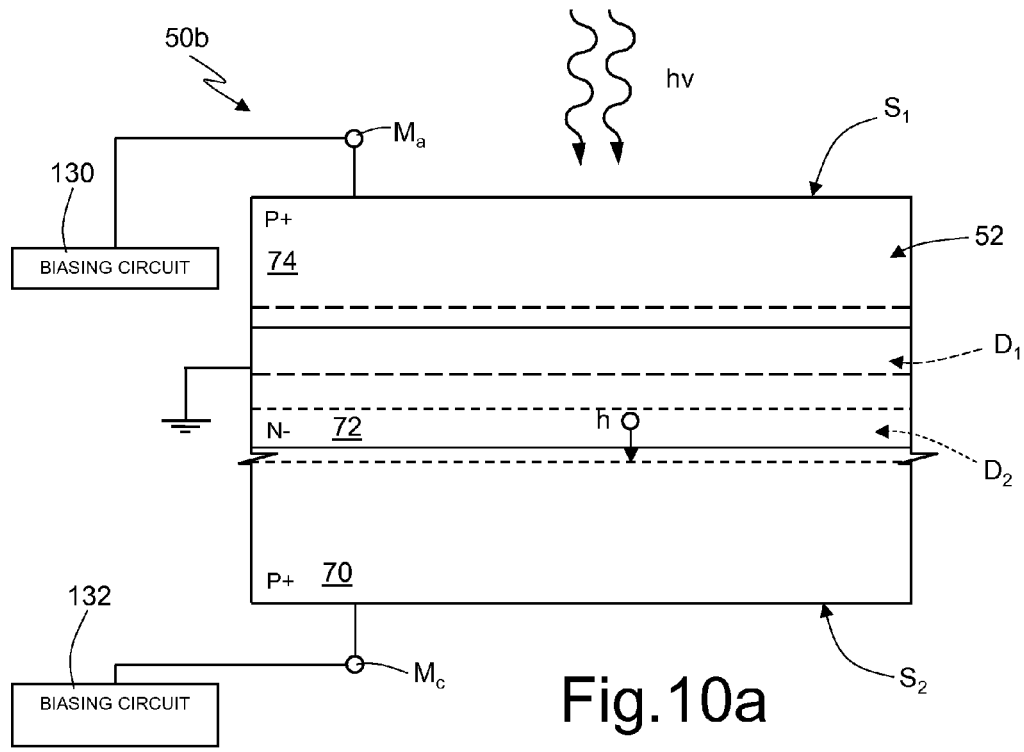

FIG. 10a shows a second photodiode of the avalanche type operating in Geiger mode, referred to hereinafter as "second photodiode 50b".

The second photodiode 50b comprises the substrate (here designated by 70), as well as the first and second epitaxial layers (here designated, respectively, by 72 and 74).

In detail, the substrate 70 and the first and second epitaxial layers 72, 74 are, respectively, of a P+ type, an N− type, and a P+ type. The top surface $S_1$ and the bottom surface $S_2$ of the semiconductor body 52 are defined, respectively, by the second epitaxial layer 74 and by the substrate 70.

For instance, the substrate 70 may have a doping level comprised between $10^{19}$ cm$^{-3}$ and $10^{20}$ cm$^{-3}$, and a thickness comprised between 100 µm and 500 µm. The first epitaxial layer 72 may have a thickness comprised between 1 µm and 20 µm, and a doping level comprised between $10^{16}$ cm$^{-3}$ and $10^{17}$ cm$^{-3}$. The second epitaxial layer 74 may have a thickness comprised between 1 µm and 5 µm, and a doping level comprised between $10^{19}$ cm$^{-3}$ and $10^{20}$ cm$^{-3}$.

The first epitaxial layer 72 is connected to ground, whereas the second epitaxial layer 74 and the substrate 70 are connected, respectively, to the anode electrode $M_a$ and to the cathode electrode $M_c$. The first and second biasing circuits 130, 132 hence set the second epitaxial layer 74 and the substrate 70, respectively, at the first potential $V_1$ and at the second potential $V_2$ (which are both negative), through the anode electrode $M_a$ and the cathode electrode $M_c$, respectively. In this way, the second photodiode 50b functions as a three-terminal electronic device.

In practice, the first and second epitaxial layers 72, 74 form, respectively, the cathode region and the anode region of the first junction, which is reverse biased above the breakdown voltage $V_B$ so as to operate in Geiger mode. Furthermore, the substrate 70 and the first epitaxial layer 72 form, respectively, the anode region and the cathode region of the second junction, which is weakly reverse biased, for example, with a voltage of −5 V.

If the depleted regions of the first and second junctions are once again referred as "first and second depleted regions $D_1$, $D_2$", respectively, is it is found that, when $V_1=-30$ V and $V_2=-5$ V, the first and second depleted regions $D_1$, $D_2$ are separate, but the distance between them is not greater than 0.2 µm.

Consequently, the quasi neutral portion of the first epitaxial layer 72 delimited by the first and second depleted regions $D_1$, $D_2$ has a particularly limited thickness, with consequent reduction of the probability of absorption of photons within them. Consequently, also the probability of holes being generated within the quasi neutral portion of the first epitaxial layer 72 is reduced. Furthermore, as regards the holes of the electron-hole pairs that can be generated following upon absorption of photons in the second depleted region $D_2$, given the reverse biasing of the second junction, they are collected at the cathode electrode $M_c$ without them being able to reach the first depleted region $D_1$. Consequently, also the theoretical function that describes the ratio $R_{d-tot\_mod}$ for the second photodiode 50b is of the type illustrated in FIG. 8.

Figure 10B:
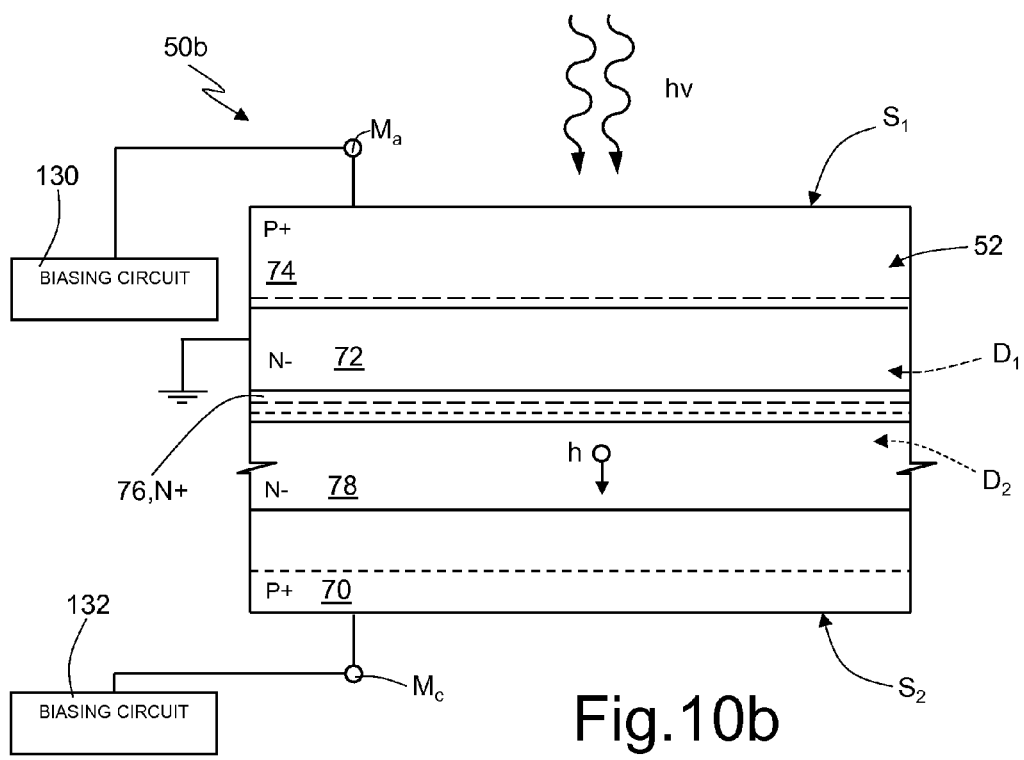

As illustrated in FIG. 10b, the second photodiode 50b may moreover include the buffer layer (here designated by 76), which is once again of an N+ type and may have a thickness comprised between 0.5 µm and 1 µm, and a doping level comprised between $10^{19}$ cm$^{-3}$ and $10^{20}$ cm$^{-3}$. Once again, the second photodiode 50b may include an additional layer 78, of an N− type, with a thickness comprised between 1 µm and 20 µm, and a doping level comprised between $10^{16}$ cm$^{-3}$ and $10^{17}$ cm$^{-3}$.

More in particular, the additional layer 78 extends on top of the substrate 70, with which it is in direct contact, whilst the buffer layer 76 is arranged between the first epitaxial layer 72 and the additional layer 78. Consequently, the additional layer 78, the buffer layer 76, and the first epitaxial layer 72 define the cathode region of the first junction, the anode region of which is formed once again by the second epitaxial layer 74. Furthermore, the additional layer 78, the buffer layer 76, and the first epitaxial layer 72 also define the cathode region of the second junction, the anode region of which is formed by the substrate 70.

In use, is it is found that, when $V_1$ and $V_2$ are, for example, equal to −30 V and −5 V, the first depleted region $D_1$ extends through the entire first epitaxial layer 72, as well as into a top portion of the buffer layer 76. The second depleted region $D_2$ extends through the entire additional layer 78, as well as into a bottom portion of the buffer layer 76, without contacting the first depleted region $D_1$.

In practice, there is an increase in the incidence of the charge carriers generated in the first depleted region $D_1$ in generating avalanche events as compared to the incidence of the holes generated in the quasi neutral portion of the buffer layer 62, which has a very limited thickness.

Figure 11:
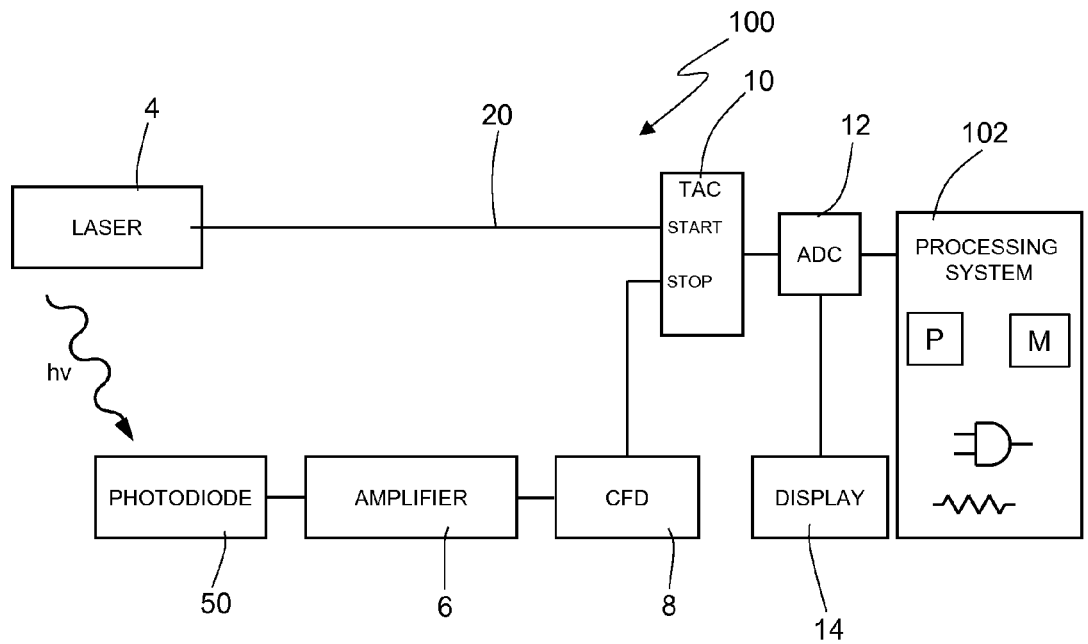
FIG. 11 shows a block diagram of an embodiment of a spectrometer.

The first and second photodiodes 50a, 50b can both be used in the present spectrometer, illustrated in FIG. 11, where it is designated by 100. Elements of the spectrometer 100 already present in the detection system 1 illustrated in FIG. 1 are designated by the same reference numbers. Furthermore, except where otherwise specified, it is generally assumed that operation of the spectrometer 100 is the same as the operation described for the detection system 1.

As compared to the detection system 1, the spectrometer 100 comprises, instead of the SPAD 2, for example, the first photodiode 50a or else the second photodiode 50b; purely by way of example, the embodiment illustrated in FIG. 11 includes the photodiode 50.

As has been described for the SPAD 2, also the photodiode 50 generates a photodiode signal, which is amplified by the pre-amplifier 6, which in turn generates the pre-amplified signal. On the basis of the pre-amplified signal, the constant fraction discriminator 8 generates the second driving signal, the electrical pulses of which indicate corresponding instants of detection of photons by the photodiode 50b.

The spectrometer 100 further comprises a processing system 102, connected to the output of the analog-to-digital converter 12 in such a way as to receive the digitized signal supplied by the analog-to-digital converter 12.

Figure 12:
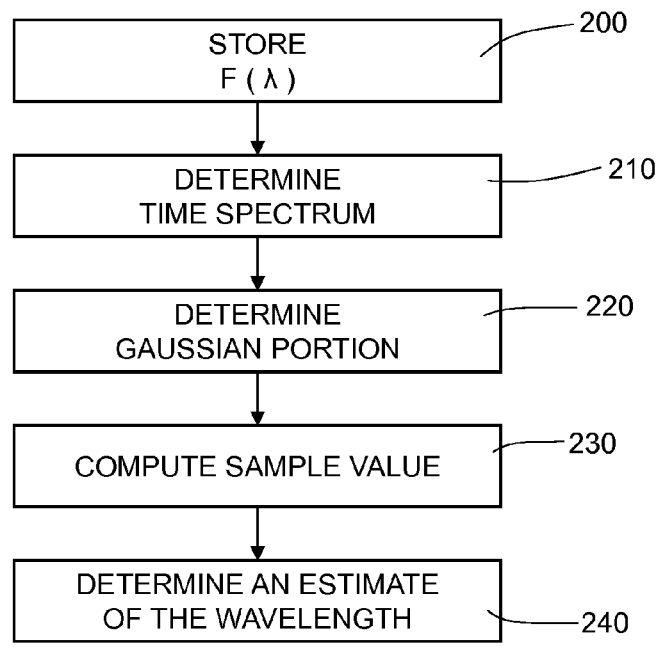
FIGS. 12 and 13 show block diagrams regarding operations performed by embodiments a processing system included in the spectrometer illustrated in FIG. 11.

In detail, the processing system 102 is designed for executing the operations illustrated in FIG. 12. The processing system 102 as illustrated includes a processor P, a memory M and discrete circuitry, as illustrated an AND gate and a resistor.

For example, the processor P may execute instructions stored in the memory M to provide functionality of the processing system 102, the discrete circuitry may be configured to provide functionality of the processing system 102, etc., and various combinations thereof. The order in which the operations are executed by the processing system 102 is purely indicative in the sense that some of the operations described hereinafter can be carried out in a different order.

In particular, the processing system 102 stores (block 200) an indication of a theoretical probability function $F(\lambda)$ that represents the plot of the ratio $R_{d\text{-}tot\_mod}$ between the number of avalanche events triggered by charge carriers generated in the effective depleted region, as occurred within the photodiode 50 during a time window of arbitrary duration, and the corresponding total number of avalanche events triggered in the photodiode 50 during the same time window, as the wavelength varies. Consequently, the indication of the theoretical probability function $F(\lambda)$ indicates the probability, given an avalanche event that has occurred within the photodiode 50, of it having been triggered by a charge carrier generated in the effective depleted region. The indication of the theoretical probability function $F(\lambda)$ may comprise the theoretical probability function $F(\lambda)$.

The indication of the theoretical probability function $F(\lambda)$ can be discrete, or else can be interpolated starting from a plurality of discrete values. In either case, the indication of the theoretical probability function $F(\lambda)$ can be determined as described previously with reference to FIGS. 7 and 8. Furthermore, the processing system 102 can acquire the indication of the theoretical probability function $F(\lambda)$ from outside.

Next, the processing system 102 determines (block 210) the time spectrum of the photodiode 50 on the basis of the digitized signal supplied by the analog-to-digital converter 12.

Figure 13:
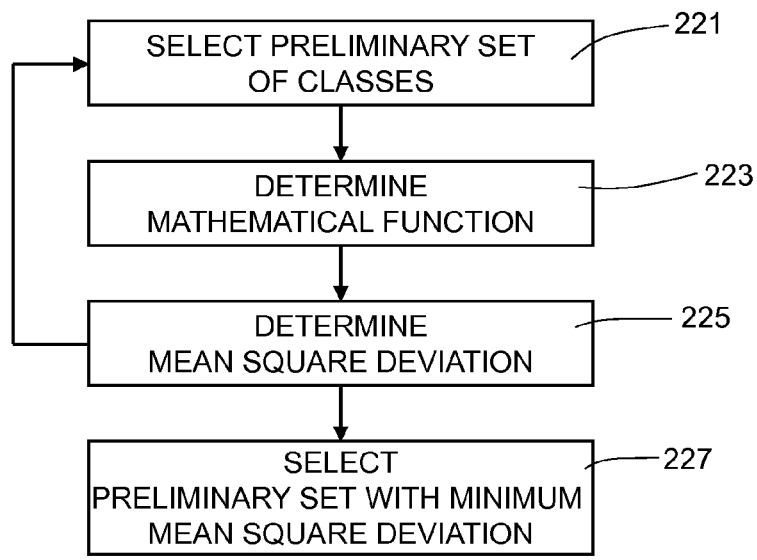

Next, the processing system 102 determines (block 220), in a way in itself known, the corresponding first portion of time spectrum, referred to hereinafter as the Gaussian portion. As described with reference to FIG. 2, the Gaussian portion is formed by the set of classes of the time spectrum the heights of which respond to a law of a Gaussian type, i.e., they approximate a Gaussian function. In this connection, it should be noted that the definition of the Gaussian portion is not critical for implementation of an embodiment; consequently, it may be made in different ways. For example, the processing system 102 may execute the operations illustrated in FIG. 13.

For example, the processing system 102 selects (block 221) in an arbitrary way a first preliminary set of adjacent classes containing the class having the maximum height of the entire time spectrum and an arbitrary number of nearby classes, such as, for example, the preceding N classes and the subsequent N classes.

Next, the processing system 102 determines (block 223) a first mathematical function of a Gaussian type, by means of regression of the heights of the first preliminary set of classes, possibly normalized so as to eliminate the contributions due to dark events. In detail, the regression may occur on the basis of two parameters of the first interpolation function, such as, for example, the mean point and the standard deviation. Furthermore, the processing system 102 determines (block 225) a first mean square deviation between the heights of the first preliminary set of classes and the first mathematical function.

Next, the processing system 102 iterates the operations referred to in block 221 so as to select a second preliminary set of adjacent classes, including the first preliminary set of classes. For example, the processing system 102 can select, in addition to the classes of the first preliminary set, the class immediately preceding the first class of the first preliminary set and the class immediately following the last class of the first preliminary set.

Next, the processing system 102 iterates the operations referred to in blocks 223 and 225, on the basis of the second preliminary set of classes, so as to determine a second mathematical function and a second mean square deviation.

The operations referred to in block 221-225 are iterated an arbitrary number of times. Next, the processing system 102 selects (block 227) the preliminary set of classes to which there corresponds the minimum mean square deviation, identifying the Gaussian portion with the preliminary set of classes selected.

After identifying the Gaussian portion, the processing system 102 calculates (block 230, FIG. 12) a sample value C equal to the ratio between the sum of the heights (i.e., the numbers of delays) of the classes of the Gaussian portion of the time spectrum and the sum of the heights of all the classes of the time spectrum. In practice, the sample value C is equal to the ratio between the number of delays that fall within the Gaussian portion and the total number of delays of the time spectrum.

The processing system 102 then determines (block 240), given the sample value C and the theoretical probability function $F(\lambda)$, at which wavelength the theoretical probability function $F(\lambda)$ assumes the value that most closely approaches the sample value C. The wavelength thus determined represents an estimate of the wavelength of the laser 4.

For example, the indication of the theoretical probability function $F(\lambda)$ may be stored in the form of a look-up table for the sample value C to obtain a corresponding estimated wavelength.

As has been said, the theoretical probability function $F(\lambda)$ for the second photodiode 50b has a plot of the type illustrated in FIG. 8; hence it is monotonic as the wavelength varies. Consequently, the operations referred to in block 240 enable a unique determination of the estimate of the wavelength of the laser 4.

As mentioned previously, the spectrometer 100 may moreover include, instead of the first or second photodiodes 50a, 50b, a photodiode of a known type, such as, for example, the SPAD 2 illustrated in FIG. 3.

Figure 14:
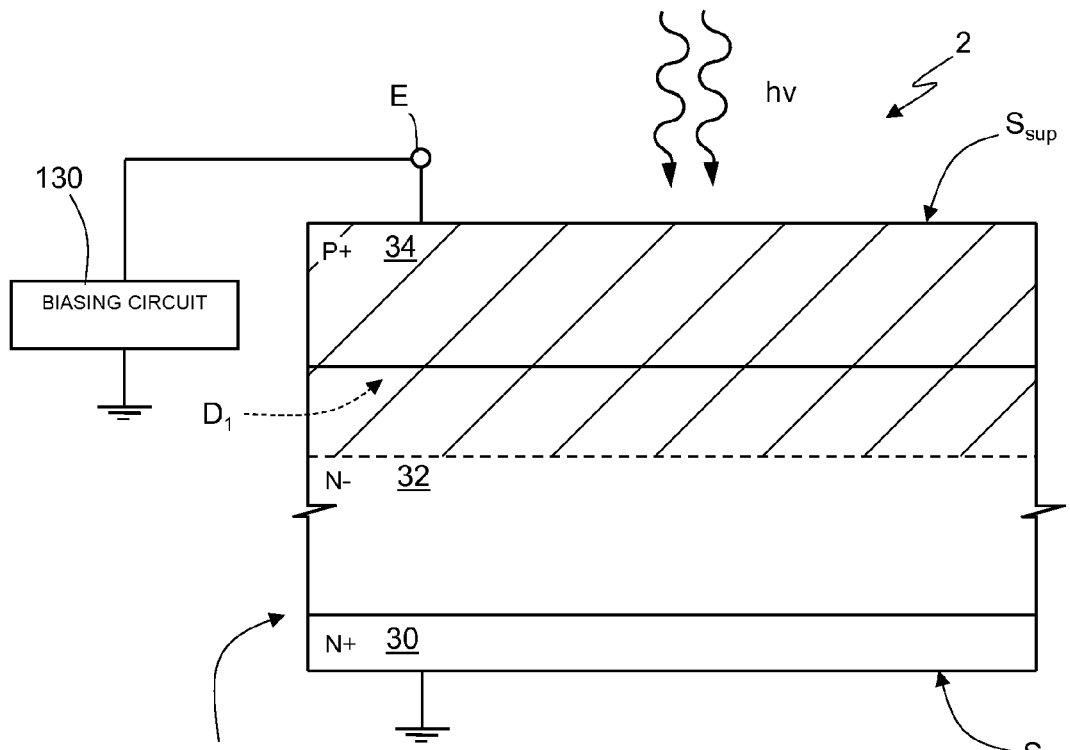

As illustrated in FIG. 14, the SPAD 2 is reverse biased, for example, by the first biasing circuit 130 at a voltage such that the depleted region $D_1$ (represented with oblique lines) extends until it occupies the second epitaxial layer 34 entirely. For this purpose, the first biasing circuit is connected between ground and the electrode E.

In practice, the depleted region $D_1$ extends as far as the first surface $S_{sup}$ of the body 25 made of semiconductor material, occupying entirely the second epitaxial layer 34, hence eliminating the quasi neutral portion of the anode region of the first junction. Consequently, the probability of triggering avalanche events by the electrons generated in the quasi neutral portion of the second epitaxial layer 34 is eliminated thanks to the absence of this quasi neutral portion. Consequently, the theoretical function that describes the ratio $R_{d\text{-}tot\_mod}$ for the SPAD 2 thus biased is of the type illustrated in FIG. 8.

The advantages that may be provided by embodiments of the present spectrometer affords emerge clearly from the foregoing discussion.

In particular, an embodiment of present spectrometer enables use of a time-correlated single-photon counting (TC-SPC) system also as a system for determining the wavelength of any (coherent) light source.

Finally, it is evident that modifications and variations may be made to the embodiments of a spectrometer described herein.

For example, the types P and N may be reversed, in which case the anode and cathode electrodes $M_a$, $M_c$ are set at positive potentials with respect to ground.

Furthermore, instead of a single photodiode, the spectrometer may include a SiPM formed by a plurality of photodiodes, for example that are the same as the first photodiode 50a or the second photodiode 50b.

In another example, to calculate the sample value C, the processing system 102 may calculate the integral of the mathematical function to which there corresponds the minimum mean square deviation, this integral being calculated on the corresponding set of preliminary classes.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A spectrometer, comprising:
   an avalanche photodiode, including a first region and a second region having different types of conductivity and forming a first junction, the photodiode being configured to:
   form a first depletion region; and
   generate a detection signal indicative of instants of detection of photons of optical pulses;
   a converter configured to:
   receive the detection signal and a synchronization signal indicative of instants of emission of optical pulses; and
   generate a delay signal indicative of delays between instants of detection and corresponding instants of emission; and
   one or more processing devices configured to:
   determine a statistical distribution of delays between instants of detection and corresponding instants of emission based on the electrical delay signal;
   select a first portion of the statistical distribution;
   determine a sample value correlated to a ratio between a number of delays that fall within the first portion of the statistical distribution and a total number of delays of the statistical distribution; and
   estimate a wavelength of optical pulses based on stored correlation information and the sample value.

2. The spectrometer according to claim 1, further comprising a biasing circuit electrically coupled to said first and second regions of the photodiode and configured to reverse bias said first junction so that said first depletion region occupies entirely the first region.

3. The spectrometer according to claim 1 wherein,
   the first and second regions are, respectively, of a first type of conductivity and of a second type of conductivity;
   the photodiode comprises a third region of the first type of conductivity;
   the second region is positioned between the first and third regions;
   the second and third regions form a second junction; and
   the photodiode is configured to form a second depletion region, the first and second depletion regions defining a non-depleted portion of the second region.

4. The spectrometer according to claim 3 wherein,
   the second region comprises a first subregion, a second subregion and a third subregion; and
   the second subregion is positioned between the first and third subregions and has a doping level higher than doping levels of the first and third subregions.

5. The spectrometer according to claim 3 wherein the second region is configured to couple to a first reference potential.

6. The spectrometer according to claim 1 wherein,
   the first and second regions are, respectively, of a first type of conductivity and of a second type of conductivity;
   the photodiode comprises a third region and a fourth region, respectively, of the first and second types of conductivity;
   the first, second, third, and fourth regions are positioned in succession; and
   the third and fourth regions form a second junction.

7. The spectrometer according to claim 6 wherein the second and third regions are configured to couple to a reference potential.

8. The spectrometer according to claim 6 wherein the photodiode further comprises a buffer layer positioned between the second and third regions and having a doping level higher than a doping level of the second region.

9. The spectrometer of claim 1 wherein the first portion of the statistical distribution comprises a portion approximating a Gaussian distribution and the stored correlation information is based on a theoretical function correlating a probability of an avalanche event within the photodiode having been triggered by a charge carrier generated in a portion of the photodiode including the first depletion region with a wavelength of a corresponding photon.

10. A system, comprising:
an avalanche photodiode, including a first region and a second region having different types of conductivity and forming a first junction, the photodiode being configured to:
form a first depletion region; and
generate a detection signal indicative of instants of detection of photons of optical pulses;
a converter configured to:
receive the detection signal and a synchronization signal indicative of instants of emission of optical pulses; and
generate a delay signal indicative of delays between instants of detection and corresponding instants of emission;
one or more processing devices configured to:
determine a statistical distribution of delays between instants of detection and corresponding instants of emission based on the electrical delay signal;
select a first portion of the statistical distribution;
determine a sample value correlated to a ratio between a number of delays that fall within the first portion of the statistical distribution and a total number of delays of the statistical distribution; and
estimate a wavelength of optical pulses based on stored correlation information and the sample value; and
a display coupled to the converter.

11. The system of claim 10 wherein the first portion of the statistical distribution comprises a portion approximating a Gaussian distribution and the stored correlation information is based on a theoretical function correlating a probability of an avalanche event within the photodiode having been triggered by a charge carrier generated in a portion of the photodiode including the first depletion region with a wavelength of a corresponding photon.

12. The system of claim 10 wherein,
the first and second regions are, respectively, of a first type of conductivity and of a second type of conductivity;
the photodiode comprises a third region of the first type of conductivity;
the second region is positioned between the first and third regions;
the second and third regions form a second junction; and
the photodiode is configured to form a second depletion region, the first and second depletion regions defining a non-depleted portion of the second region.

13. The system of claim 12 wherein,
the second region comprises a first subregion, a second subregion and a third subregion; and
the second subregion is positioned between the first and third subregions and has a doping level higher than doping levels of the first and third subregions.

14. The system of claim 10 wherein,
the first and second regions are, respectively, of a first type of conductivity and of a second type of conductivity;
the photodiode comprises a third region and a fourth region, respectively, of the first and second types of conductivity;
the first, second, third, and fourth regions are positioned in succession; and
the third and fourth regions form a second junction.

15. The system of claim 14 wherein the photodiode further comprises a buffer layer positioned between the second and third regions and having a doping level higher than a doping level of the second region.

16. The system of claim 10, further comprising a coherent light source configured to generate optical pulses and the synchronization signal.

17. A method, comprising:
generating, using an avalanche photodiode, a detection signal indicative of instants of detection of photons of optical pulses;
generating a delay signal indicative of delays between instants of detection of photons and corresponding instants of emission of optical pulses;
determining a statistical distribution of delays between the instants of detection and corresponding instants of emission based on the delay signal;
selecting a first portion of the statistical distribution;
calculating a sample value based on a ratio between a number of delays within the first portion of the statistical distribution and a total number of delays of the statistical distribution; and
estimating a wavelength of optical pulses based on stored correlation information and the calculated sample value.

18. The method of claim 17 wherein the generating the detection signal comprises reverse biasing a first junction between first and second regions of the avalanche photodiode to form a first depletion region, the first and second regions having different conductivity types.

19. The method of claim 18 wherein the first depletion region occupies entirely the first region.

20. The method of claim 18 wherein,
the first and second regions are, respectively, of a first type of conductivity and of a second type of conductivity;
the avalanche photodiode comprises a third region of the first type of conductivity;
the second region is positioned between the first and third regions;
the second and third regions form a second junction; and
the method comprises reverse biasing the second junction to form a second depletion region.

21. The method of claim 18 wherein,
the first and second regions are, respectively, of a first type of conductivity and of a second type of conductivity;
the avalanche photodiode comprises a third region and a fourth region, respectively, of the first and second types of conductivity;
the first, second, third, and fourth regions are positioned in succession;
the third and fourth regions form a second junction; and
the method comprises:
coupling the second and third regions to a reference potential; and
forward biasing the second junction.

22. The method according to claim 18 wherein reverse biasing the first junction comprises biasing the first junction at a voltage higher in modulus than a breakdown voltage of the first junction.

23. The method of claim 18 wherein the first portion of the statistical distribution comprises a portion approximating a Gaussian distribution and the stored correlation information is based on a theoretical function correlating a probability of an avalanche event within the photodiode having been triggered by a charge carrier generated in a portion of the photodiode including the first depletion region with a wavelength of a corresponding photon.

24. A non-transitory computer-readable medium whose contents configure a processing system to perform a method, the method comprising:
- generating, using an avalanche photodiode, a detection signal indicative of instants of detection of photons of optical pulses;
- determining a statistical distribution of delays between instants of detection of photons of optical pulses and corresponding instants of emission of optical pulses based on a delay signal;
- selecting a first portion of the statistical distribution approximating a Gaussian distribution;
- calculating a sample value based on a ratio between a number of delays within the first portion of the statistical distribution and a total number of delays of the statistical distribution; and
- estimating a wavelength of optical pulses based on stored correlation information and the calculated sample value.

25. The non-transitory computer-readable medium of claim 24 wherein the stored correlation information is based on a theoretical function correlating a probability of an avalanche event within a photodiode having been triggered by a charge carrier generated in a portion of the photodiode including a first depletion region with a wavelength of a corresponding photon.

* * * * *